US012333460B2

(12) United States Patent
Pan et al.

(10) Patent No.: US 12,333,460 B2
(45) Date of Patent: Jun. 17, 2025

(54) DISPLAY OF MULTI-MODAL VEHICLE INDICATORS ON A MAP

(71) Applicant: Lyft, Inc., San Francisco, CA (US)

(72) Inventors: Anna Pan, San Francisco, CA (US);
Bradley Ellis, San Francisco, CA (US);
Jaden Junghyun Choi, Temecula, CA (US); Kevin Michael Tezlaf, Oakland, CA (US); Mario Gomez-Hall, San Francisco, CA (US); Robert Joseph Marsan, San Francisco, CA (US);
Sravanthi Kadali, San Francisco, CA (US); Christine Mara Todorovich, San Francisco, CA (US); Marc Haumann, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 882 days.

(21) Appl. No.: 16/714,297

(22) Filed: Dec. 13, 2019

(65) Prior Publication Data

US 2021/0182751 A1 Jun. 17, 2021

(51) Int. Cl.
| G06Q 10/0631 | (2023.01) |
| G06F 3/04847 | (2022.01) |
| G06T 11/00 | (2006.01) |
| H04L 67/306 | (2022.01) |
| H04W 4/029 | (2018.01) |

(52) U.S. Cl.
CPC ... *G06Q 10/06311* (2013.01); *G06F 3/04847* (2013.01); *G06T 11/00* (2013.01); *H04L 67/306* (2013.01); *H04W 4/029* (2018.02)

(58) Field of Classification Search
None
See application file for complete search history.

(56) References Cited

U.S. PATENT DOCUMENTS

| 10,460,602 | B1* | 10/2019 | Dorne | G08G 1/123 |
| 10,482,226 | B1* | 11/2019 | Konrardy | B60L 53/36 |
| 10,710,578 | B1* | 7/2020 | Dang | G06N 3/08 |
| 10,896,234 | B2* | 1/2021 | Takahashi | G06F 16/9537 |
| 11,604,463 | B1* | 3/2023 | Trivedi | G08G 1/205 |

(Continued)

OTHER PUBLICATIONS

Transit App.; https://transitapp.com/; retrieved Jan. 8, 2020(5 pages).

(Continued)

*Primary Examiner* — Chesiree A Walton
(74) *Attorney, Agent, or Firm* — Keller Preece PLLC

(57) ABSTRACT

Methods and systems for identifying and selectively displaying indications of nearby vehicles are presented. In one example, a method is provided that includes receiving locations of vehicles located near a location of a user device. The vehicles may include vehicles of a first type and vehicles of a second type. A cluster including at least a first subset of the vehicles of the first type may be identified and a location of the cluster may be identified. The location of the cluster may represent the location of at least one of the first subset of the vehicles. A second subset of the vehicles of the second type may then be identified including at most a predetermined quantity of vehicles. A map may be generated that includes a first indication at the location of the cluster and second indications at the location of the second subset of the vehicles.

20 Claims, 14 Drawing Sheets

(56) References Cited

U.S. PATENT DOCUMENTS

| | | | |
|---|---|---|---|
| 2018/0211541 A1* | 7/2018 | Rakah | G08G 1/148 |
| 2019/0303451 A1* | 10/2019 | Takahashi | G06F 16/29 |
| 2020/0200562 A1* | 6/2020 | Vereshchagin | G06F 16/285 |
| 2023/0117771 A1* | 4/2023 | Beaurepaire | G06V 20/58 |
| | | | 382/104 |

OTHER PUBLICATIONS

Nickelsburg, Monica; Google Maps adds Lime scooters and bikes as transportation options in more than 100 cities; GeekWire; Aug. 13, 2019; https://www.geekwire.com/2019/google-maps-adds-lime-scooters-transportation-option-100-cities/; retrieved Jan. 8, 2020 (9 pages).

How to use Citymapper—the app that gives you directions and transport options for cities; BT; Mar. 4, 2018; https://home.bt.com/tech-gadgets/internet/how-to-use-citymapper-offline-which-cities-in-11364254337671; retrieved Jan. 8, 2020 (8 pages).

Constine, Josh; Embracing multimodality, Uber pioneers ride recommendations; TechCrunch; Oct. 18, 2018; https://techcrunch.com/2018/10/18/uber-recommendations/; retrieved Jan. 8, 2020 (13 pages).

Constine, Josh; 25+ launches from Uber's big event; TechCrunch; Sep. 26, 2019; https://techcrunch.com/2019/09/26/uber-uber-eats/; retrieved Jan. 8, 2020 (19 pages).

CNN Wire; Uber will now show you where to rent bikes and scooters; WGNO; Jul. 1, 2019; https://wgno.com/2019/07/01/uber-will-now-show-you-where-to-rent-bikes-and-scooters/; retrieved Jan. 8, 2020 (4 pages).

Dickey, Megan Rose; Uber brings bikes and scooters, including Lime's, to the forefront; Jul. 1, 2019; TechCrunch; https://techcrunch.com/2019/07/01/uber-brings-bikes-and-scooters-including-limes-to-the-forefront/; retrieved Jan. 8, 2020 (8 pages).

CNN Wire; Self-driving scooters are coming to city sidewalks; ABC7 Chicago; https://abc7chicago.com/technology/self-driving-scooters-are-coming-to-city-sidewalks/5620414/; retrieved Jan. 8, 2020 (7 pages).

\* cited by examiner

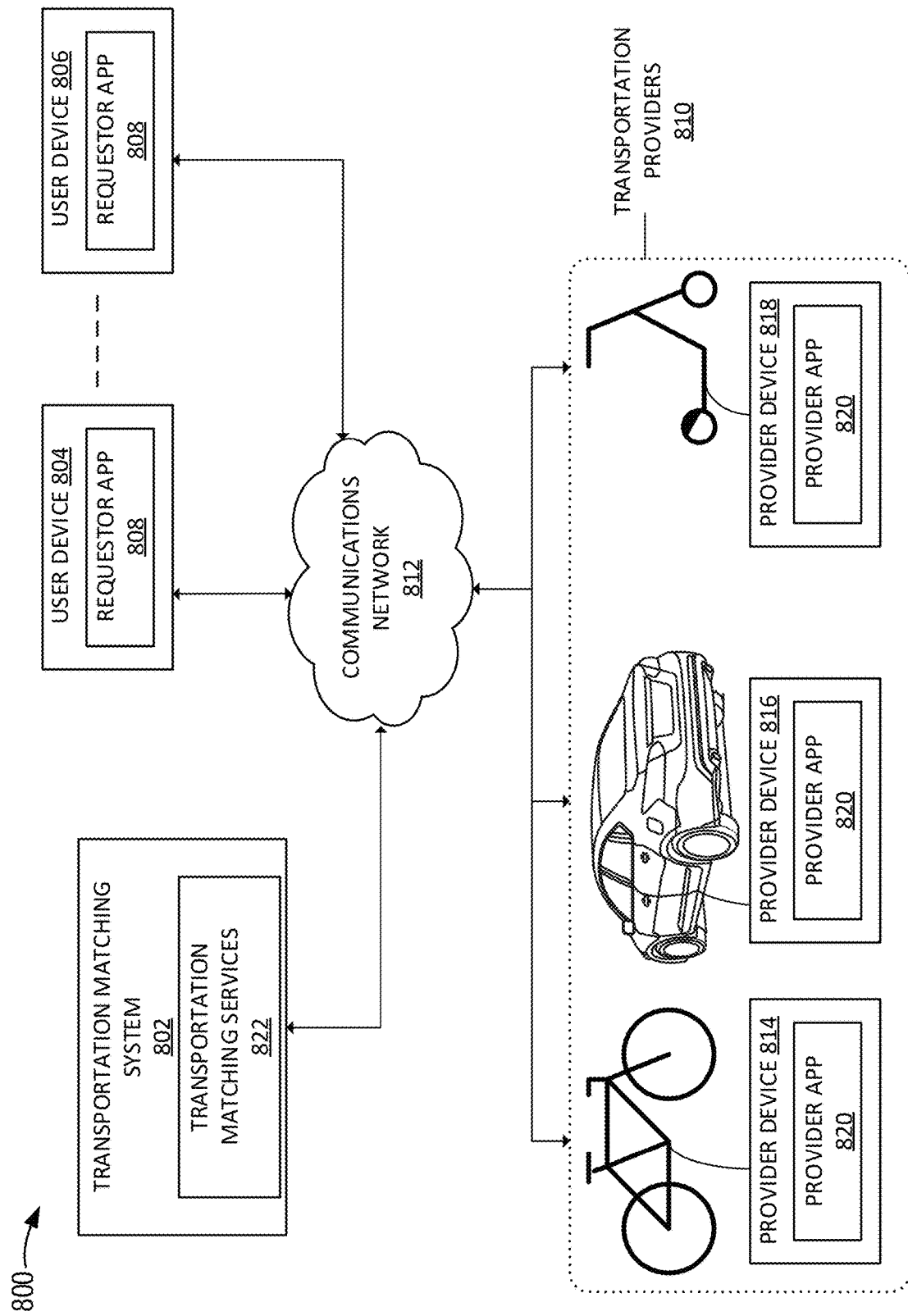

DISPLAY OF MULTI-MODAL VEHICLE INDICATORS ON A MAP

BACKGROUND

Individuals desiring transportation (e.g., transportation by vehicle) between locations can submit transportation requests to transportation providers. In particular, users may submit transportation requests that identify specific locations between which transportation is desired and/or specific types of vehicles desired for use in provided transportation. In response, transportation providers may identify multiple vehicles capable of fulfilling the transportation requests.

SUMMARY

The present disclosure presents new and innovative systems and methods for efficiently displaying indicators visual indicators for vehicles of different modalities within limited screen space. In a first aspect, a system is provided including a processor and a memory. The memory stores instructions which, when executed by the processor, cause the processor to transmit a location of a user device, receive locations of vehicles located near the location of the user device, the vehicles including first vehicles of a first type and second vehicles of a second type, and identify a cluster containing at least a first subset of the first vehicles. The memory may store instructions which, when executed by the processor, cause the processor to determine a location of the cluster, the location of the cluster representing a location of at least one vehicle of the first subset of the first vehicles, and identify a second subset of the second vehicles, the second subset including at most a predetermined quantity of the second vehicles. The memory stores still further instructions which, when executed by the processor, cause the processor to generate a map that presents at least a first indication at the location of the cluster and multiple second indications at the locations of the second subset of the second vehicles and display the map on the user device.

In a second aspect according to the first aspect, the location of the cluster is identified as the location of the at least one vehicle of the first subset of the first vehicles that is located closest to the location of the user device.

In a third aspect according to any of the first and second aspects, the location of the cluster is identified as the location of the at least one vehicle of the first subset of the first vehicles that is located closest to the location of the user device with one or both of a battery charge level and a predicted range greater than a predetermined threshold.

In a fourth aspect according to any of the first through third aspects, the second subset of the second vehicles is identified as at most the predetermined quantity of the second vehicles that are located nearest the location of the user device.

In a fifth aspect according to any of the first through fourth aspect, the second subset of the second vehicles is identified as at most the predetermined quantity of the second vehicles that are located nearest the location of the user device and that are not moving away from the location of the user device.

In a sixth aspect according to any of the first through fifth aspects, the second subset of the second vehicles is identified based on at least one of (i) a predicted destination of a user associated with the user device and (ii) vehicles previously utilized by a user associated with the user device.

In a seventh aspect according to any of the first through sixth aspects, the map is generated at a first zoom level presenting a first geographical area surrounding the location of the user device.

In an eighth aspect according to the seventh aspect, the first zoom level is selected based on at least one of (i) vehicles previously utilized by a user associated with the user device, (ii) the first type of the first vehicles and the second type of the second vehicles, and (iii) a predicted destination of a user associated with the user device.

In a ninth aspect according to any of the seventh and eighth aspects, the memory stores further instructions which, when executed by the processor, cause the processor to detect a user interaction changing the map from the first zoom level to a second zoom level that displays a second geographical area surrounding the location of the user device and update the cluster and the location of the cluster based on the second zoom level.

In a tenth aspect according to the ninth aspect, the second geographical area is smaller than the first geographical area. Updating the cluster may include removing one or more of the first subset of the vehicles from the cluster.

In an eleventh aspect according to any of the ninth and tenth aspects, the second geographical area is larger than the first geographical area. Updating the cluster may include adding one or more of the first vehicles that are not included in the first subset to the cluster.

In a twelfth aspect according to any of the ninth through eleventh aspects, the memory stores further instructions which, when executed by the processor, cause the processor to update the second subset of the second vehicles based on the second zoom level.

In a thirteenth aspect according to any of the first through twelfth aspects, the map displays at least one status indicator for at least one of the first subset of the vehicles and the second subset of the vehicles, the at least one status indicator providing a visual indication of a usability status of vehicles associated with the at least one of the cluster and the second subset of the vehicles.

In a fourteenth aspect according to the thirteenth aspect, the memory stores further instructions which, when executed by the processor, cause the processor to detect a change in a ride status for a user associated with the user device and adjust the usability status indicated by the at least one status indicator to account for the change in the ride status.

In a fifteenth aspect according to any of the thirteenth and fourteenth aspects, the usability status includes at least one of a quantity of available vehicles, a quantity of available docks available for vehicles associated with the at least one status indicator, and a battery charge level of one or more vehicles associated with the at least one status indicator.

In a sixteenth aspect according to any of the first through fifteenth aspect, the first type and the second type each include at least one vehicle type selected from the group consisting of automobiles, trains, buses, electrically-powered bicycles, non-electrically-powered bicycles, electrically-powered scooters, and non-electrically powered scooters.

In a seventeenth aspect, a method is provided including transmitting a location of a user device, receiving locations of vehicles located near the location of the user device, the vehicles including first vehicles of a first type and second vehicles of a second type, and identifying a cluster containing at least a first subset of the first vehicles. The method may further include determining a location of the cluster, the location of the cluster representing a location of at least one vehicle of the first subset of the first vehicles and identifying a second subset of the second vehicles, the second subset including at most a predetermined quantity of the second vehicles. The method may still further include generating a map that presents at least a first indication at the location of the cluster and multiple second indications at the locations of the second subset of the second vehicles and displaying the map on the user device.

In an eighteenth aspect according to the seventeenth aspect, the location of the cluster is identified as the location of the at least one vehicle of the first subset of the first vehicles that is located closest to the location of the user device.

In a nineteenth aspect according to any of the seventeenth and eighteenth aspects, the location of the cluster is identified as the location of the at least one vehicle of the first subset of the first vehicles that is located closest to the location of the user device with one or both of a battery charge level and a predicted range greater than a predetermined threshold.

In a twentieth aspect according to any of the seventeenth through nineteenth aspects, the second subset of the second vehicles is identified as at most the predetermined quantity of the second vehicles that are located nearest the location of the user device.

In a twenty-first aspect according to any of the seventeenth through twentieth aspects, the second subset of the second vehicles is identified as at most the predetermined quantity of the second vehicles that are located nearest the location of the user device and that are not moving away from the location of the user device.

In a twenty-second aspect according to any of the seventeenth through twenty-first aspect, the second subset of the second vehicles is identified based on at least one of (i) a predicted destination of a user associated with the user device and (ii) vehicles previously utilized by a user associated with the user device.

In a twenty-third aspect according to any of the seventeenth through twenty-second aspects, the map is generated at a first zoom level presenting a first geographical area surrounding the location of the user device.

In a twenty-fourth aspect according to the twenty-third aspects, the first zoom level is selected based on at least one of (i) vehicles previously utilized by a user associated with the user device, (ii) the first type of the first vehicles and the second type of the second vehicles, and (iii) a predicted destination of a user associated with the user device.

In a twenty-fifth aspect according to any of the twenty-third and twenty-fourth aspects, the method further includes detecting a user interaction changing the map from the first zoom level to a second zoom level that displays a second geographical area surrounding the location of the user device and updating the cluster and the location of the cluster based on the second zoom level.

In a twenty-sixth aspect according to the twenty-fifth aspect, the second geographical area is smaller than the first geographical area. Updating the cluster may include removing one or more of the first subset of the vehicles from the cluster.

In a twenty-seventh aspect according to the twenty-fifth aspect, the second geographical area is larger than the first geographical area. Updating the cluster may include adding one or more of the first vehicles that are not included in the first subset to the cluster.

In a twenty-eighth aspect according to any of the twenty-fifth through twenty-seventh aspect, the method further includes updating the second subset of the second vehicles based on the second zoom level.

In a twenty-ninth aspect according to any of the seventeenth through twenty-eighth aspects, the map displays at least one status indicator for at least one of the first subset of the vehicles and the second subset of the vehicles, the at least one status indicator providing a visual indication of a usability status of vehicles associated with the at least one of the cluster and the second subset of the vehicles.

In a thirtieth aspect according to the twenty-ninth aspect, the method further includes detecting a change in a ride status for a user associated with the user device and adjusting the usability status indicated by the at least one status indicator to account for the change in the ride status.

In a thirty-first aspect according to any of the twenty-ninth and thirtieth aspects, the usability status includes at least one of a quantity of available vehicles, a quantity of available docks available for vehicles associated with the at least one status indicator, and a battery charge level of one or more vehicles associated with the at least one status indicator.

In a thirty-second aspect according to any of the seventeenth through seventeenth aspect, the first type and the second type each include at least one vehicle type selected from the group consisting of automobiles, trains, buses, electrically-powered bicycles, non-electrically-powered bicycles, electrically-powered scooters, and non-electrically powered scooters.

In a thirty-third aspect, a non-transitory, computer-readable medium is provided storing instructions which, when executed by a processor, cause the processor to transmit a location of a user device, receive locations of vehicles located near the location of the user device, the vehicles including first vehicles of a first type and second vehicles of a second type, and identify a cluster containing at least a first subset of the first vehicles. The non-transitory, computer-readable medium may store further instructions which, when executed by a processor, cause the processor to determine a location of the cluster, the location of the cluster representing a location of at least one vehicle of the first subset of the first vehicles and identify a second subset of the second vehicles, the second subset including at most a predetermined quantity of the second vehicles. The non-transitory, computer-readable medium may store still further instructions which, when executed by a processor, cause the processor to generate a map that presents at least a first indication at the location of the cluster and multiple second indications at the locations of the second subset of the second vehicles and display the map on the user device.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

BRIEF DESCRIPTION OF THE FIGURES

FIG. 8 illustrates a transportation matching system according to exemplary embodiments of the present disclosure.

DETAILED DESCRIPTION OF EXAMPLE EMBODIMENTS

Aspects of the present disclosure involve systems and methods for identifying, filtering, clustering, and displaying indications of nearby vehicles of different modalities that are available to provide transportation. Related techniques are discussed in U.S. application Ser. No. 16/714,316, entitled "PANEL-SNAPPING INTERFACE FOR RESPONSIVE DISPLAY OF MAPS" and filed on Dec. 13, 2019.

Figures 1A, 1B:
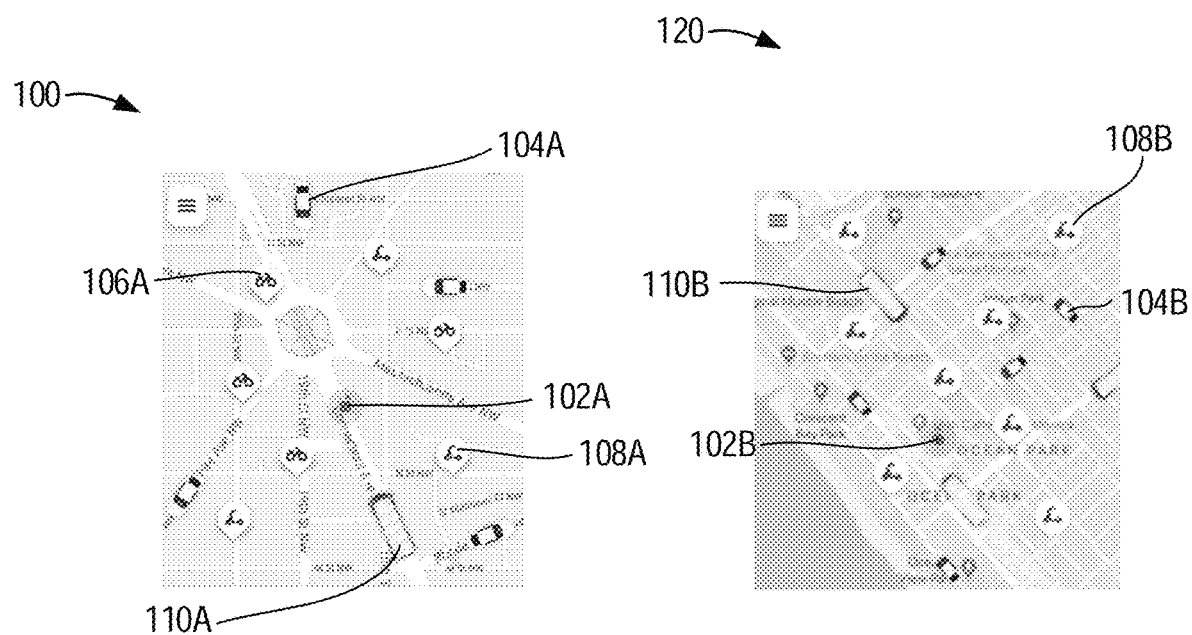
FIGS. 1A-1D illustrate multi-modal user interfaces according to exemplary embodiments of the present disclosure.

For example, when a user accesses a transportation system, such as a transportation matching system, a user may see a map generated based on the user's current location. For example, the map may present a visual representation of an area surrounding the user and may include visual indicators that correspond to the locations of particular vehicles (e.g., vehicles available for use by the user). However, the transportation matching system may have multiple types of vehicles available for use, such as automobiles, bicycles, scooters, trains, and buses. Presenting visual indicators for each of these types of vehicles can result in visually cluttered maps that are difficult to parse. For example, FIGS. 1A and 1B depict maps 100, 120. The maps 100, 120 may be displayed to users accessing a transportation matching system (e.g., a user who has launched an application associated with a transportation matching system). The maps include different visual indicators for different types of vehicles (only a subset of which, for clarity, are identified by reference numbers). Indicators 102A-B identify the current location of the user, indicators 104A-B identify locations of available cars near the user the user, indicators 106A identify locations of available bicycles near the user, indicators 108A-B identify locations of available scooters near the user, and indicators 110A-B indicate the locations of available buses near the user. Although not depicted, other implementations of the maps 100, 120 may further include indicators that identify the locations of available trains located nearby.

Separate indicators 102A-B, 104A-B, 106A, 108A-B, 110A-B are provided for individual vehicles located near the user in the maps 100, 120. As can be seen in the maps 100, 120, displaying indicators 102A-B, 104A-B, 106A, 108A-B, 110A-B in this manner creates visual confusion, as there are many indicators 102A-B, 104A-B, 106A, 108A-B, 110A-B displayed on the map 100, 120. Further, because indicators 102A-B, 104A-B, 106A, 108A-B, 110A-B corresponding to different types of vehicles are mixed together based on the locations of each individual vehicle, it can be difficult for a user to determine which of a desired vehicle type is located closest. For example, upon opening a transportation matching system application to request transportation, a user may be primarily interested in determining which of a particular type (or types) of vehicle are located closest. As a specific example, the user may be interested in locating one or more of the closest bicycle, scooter, bus, etc. As multiple types of indicators are displayed near one another, a user may not be able to quickly and visually determine which of the closest indicators corresponds to the location of the desired vehicle type, or whether a particular indicator identifies the closest vehicle of the desired vehicle type. Furthermore, certain users may not be interested in particular types of vehicles. For example, a user may frequently ride scooters and infrequently ride bicycles. Therefore, displaying indicators for nearby bicycles may not only present irrelevant information to the user, but may obscure relevant information (e.g., the locations of nearby scooters) by including extraneous indicators on the maps 100, 120.

Figures 1C, 1D:
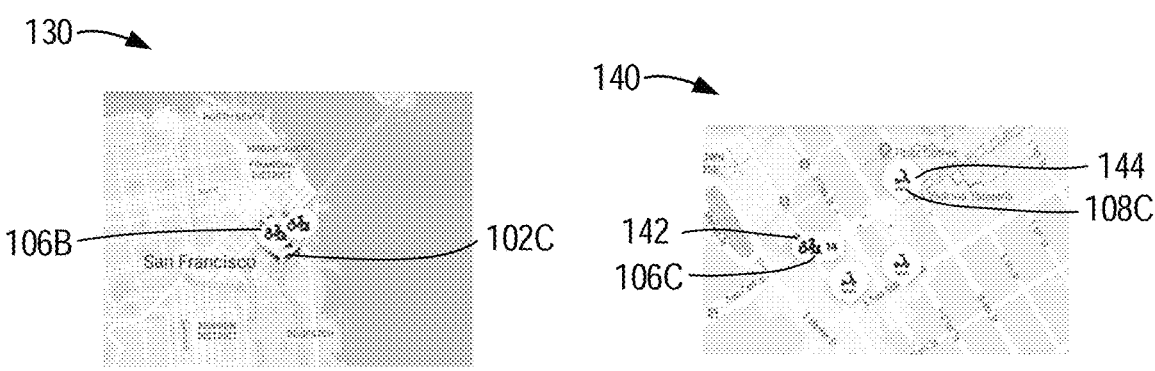

Additionally, as a user changes zoom levels for a map, visual indicators may become even more cluttered and difficult to visually process. For example, FIG. 1C depicts a map 130 that depicts a larger geographical area. For example, a user may zoom out of a map depicting a geographical area surrounding the user's current location and the map 130 may be displayed as a result. The map 130 includes multiple visual indicators, including an indicator 102C of the current location of the user and indicators 106B of bicycles located near the user. However, because the map 130 depicts such a large geographical area, the indicators 102C, 106B are located so close together that the indicators 102A, 106B overlap visually. As a result, the user cannot visually identify where each of the corresponding bicycles are located. Further, the map 130 may include indicators of other types of vehicles which may be obscured by the indicators 106B. The map 130 also does not include information regarding other portions of the depicted geographical area. Indeed, if the map 130 were to include indicators with the same density as the indicators 102C, 106B, the map 130 would be filled with a very high number of indicators that would be extremely difficult to visually parse.

Additionally, displaying separate indicators for each of the vehicles located near the user may require numerous updates to the map. For example, within a transportation matching system, vehicles of different types may be frequently accessed and relocated by users. Also, new vehicles may frequently become available. Updating maps 100, 120, 130 that include separate indicators to reflect changes in available vehicles and changes to locations of vehicles may result in maps that include multiple changing/moving indicators. Such frequent changes can both utilize excessive computing resources (e.g., to create, remove, and/or update indicators on the map) and may further complicate a user's efforts to determine which vehicles are available and where the vehicles are located.

Further, in certain implementations, the indicators may include additional information regarding associated vehicles. For example, FIG. 1D depicts a map 140 that includes an indicator 106C for nearby bicycles (e.g., docked bicycles) and indicators 108C for nearby scooters. The indicators 106C, 108C include status identifiers 142, 144. The status identifiers 142, 144 may indicate a status of the associated vehicles. For example, the status identifier 144 may indicate a charge level of the scooter associated with the indicator 108C and the status identifier 142 may indicate a proportion of bikes available at the station indicated by the indicator 106C. However, including status indicators 142, 144 on identifiers in areas with many vehicles (such as the areas depicted in the maps 100, 120, 130) may add further visual clutter, as each indicator is now more complicated.

Therefore, there exists a need to identify and select nearby vehicles of different types that may be used to provide transportation to users and for displaying a simplified representation of the nearby vehicles. Additionally such representations must be able to account for the inconsistent and dynamic changes to the locations and availability of certain vehicle types (e.g., automobiles, scooters, bicycles) and inconsistent schedules of other vehicle types (e.g., trains and buses). One way to solve this technical problem is to receive the locations of vehicles located near a user device associated with a user. The vehicles located near the user device may include vehicles of different types. A cluster may be identified that includes vehicles of a first type, such as bicycles or scooters. A location of the cluster may be identified, e.g., as the location of at least one of the vehicles included within the cluster. A map may then be generated that displays a visual indication of the cluster at the identified location of the cluster. The map may also display separate indications for different vehicles of a second type, such as trains, buses, and/or automobiles. In certain implementations, the map may be generated at an initial zoom level selected to display a predetermined quantity of vehicles of the first type and/or a predetermined quantity of vehicles of the second type. Further, the vehicles of the first and second types may be identified according to user preferences (e.g., to include vehicles that were previously used by a user associated with the user device). In this way, maps may be generated that both include vehicles that are nearby and relevant to a user and that present the locations of the vehicles that are nearby without producing visually cluttered or disjointed maps.

Figure 2:
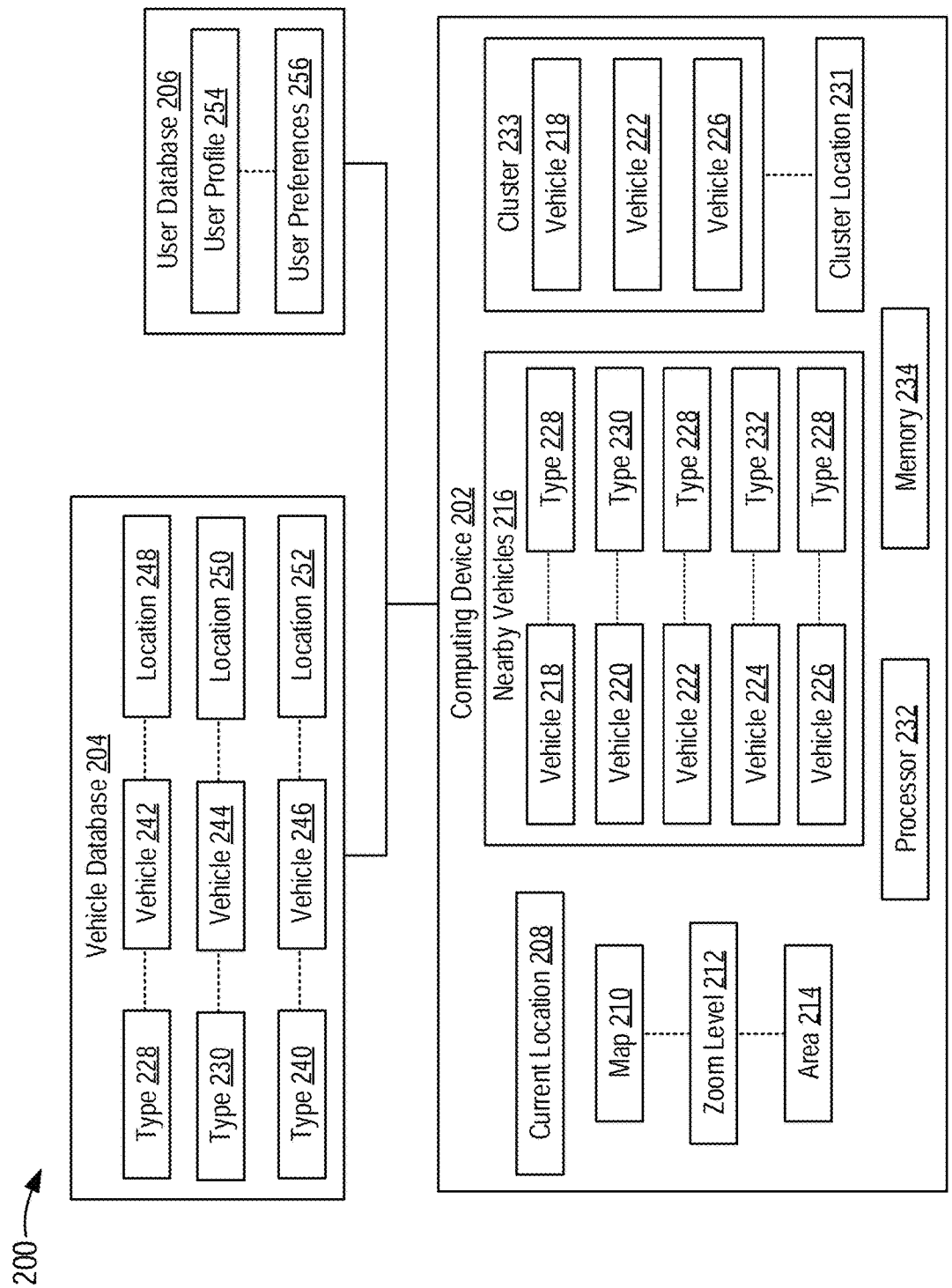
FIG. 2 illustrates a system for identifying and selecting nearby vehicles according to an exemplary embodiment of the present disclosure.

FIG. 2 illustrates a system 200 for identifying and selecting nearby vehicles according to an exemplary embodiment of the present disclosure. The system 200 may be configured to identify vehicles located near a user and to generate a map presenting at least a filtered subset of the identified vehicles to the user. The system 200 includes a computing device 202, a vehicle database 204, and a user database 206.

The vehicle database 204 stores vehicles 242, 244, 246 in association with types 228, 230, 240 and locations 248, 250, 252. The types 228, 230, 240 may identify a type of the vehicles 242, 244, 246 (e.g., automobiles, buses, trains, bicycles, scooters). For example, the type 228 may correspond to bicycles, the type 230 may correspond to scooters, and the type 240 may correspond to buses. According to the previous example, the vehicle 242 corresponding to the type 228 may be a bicycle, the vehicle 244 corresponding to the type 230 may be a scooter, and the vehicle 246 corresponding to the type 240 may be a bus. The locations 248, 250, 252 may indicate a current and/or predicted location of the corresponding vehicles 242, 244, 246. For example, for dockless bicycles and scooters, the locations 248, 250, 252 may indicate the locations of the bicycles and scooters. As another example, for automobiles, the locations 248, 250, 252 may indicate the locations of the automobiles. In certain implementations, the locations 248, 250, 252 for certain types 228, 230, 240 of vehicles may indicate locations other than the location of the vehicles themselves. For example, locations 248, 250, 252 associated with buses or trains may indicate locations at which the buses or trains may be accessed by a user (e.g., transit stops from which particular buses or trains may be accessed). As another example, for docked bicycles or scooters, the locations 248, 250, 252 may identify the locations of docks at which vehicles can be accessed and deposited. In certain implementations, the vehicle database 204 may be implemented by multiple databases and/or multiple tables within a single database. For example, the vehicle database 204 may be implemented by a separate database and/or separate data table for each type 228, 230, 240 of vehicle.

The computing device 202 includes a current location 208, a map 210, nearby vehicles 216, and a cluster 233. The computing device 202 may be configured to identify the nearby vehicles 216 and to generate the map 210 to depict at least a subset of the nearby vehicles 216 for display to a user of the computing device 202. The current location 208 may represent the current location of the computing device 202 and/or a user associated with the computing device 202. For example, the current location 208 may be acquired using a global positioning service (GPS) location, cellular signal location measure, and/or another location measure of the computing device 202. The computing device 202 may identify the nearby vehicles 216 as the vehicles located near the current location 208. For example, the computing device 202 may transmit the current location 208 to the vehicle database 204 and may receive indications of vehicles located near the current location 208. In particular, the vehicles located near the current location 208 may be identified as vehicles located within a predetermined threshold distance of the current location 208. In certain implementations, the predetermined threshold distance may differ depending on the type 228, 230, 240 of vehicle. For example, bicycles and/or scooters may have a shorter predetermined threshold distance than automobiles, buses, and/or trains. The predetermined threshold distance may also differ based on the user. For example, a first user may, in receiving transportation previously, have walked further to access scooters than a second user. The predetermined threshold distance for scooters may therefore be longer for the first user than for the second user. As depicted, the computing device 202 may then receive the nearby vehicles 216 from the vehicle database 204, including indications of the vehicles 218, 220, 222, 224, 226 and the associated types 228, 230, 232. The nearby vehicles 216 may include multiple vehicles 218, 222, 226 of the same type 228 (e.g., bicycles) and may include vehicles 220 of a second type 230 (e.g., automobiles) and vehicles 224 of a third type 232 (e.g., scooters). In practice, the nearby vehicles 216 may include more than three types 228, 230, 232 and may include multiple vehicles of two or more of the types 228, 230, 232.

In implementations where the vehicle database 204 is implemented by multiple databases, the computing device 202 may be configured to transmit the current location 208 to each of (or a subset of) the multiple databases implementing and to receive separate indications of nearby vehicles 216 of different types from the multiple databases. In such implementations, the computing device 202 may instead assemble a single set of nearby vehicles 216 as depicted based on the separate indications and/or may proceed with individually processing each of the separate indications of the nearby vehicles 216 of different types.

The computing device 202 may then identify a cluster 233 of vehicles 218, 222, 226. For example, the cluster 233 may be identified as a collection of vehicles 218, 222, 226 of one or more types 228. In certain implementations, the cluster 233 may be identified to include vehicles 218, 222, 226 of the same type 228 that are located near one another. In particular, the cluster 233 may be identified to include vehicles 218, 222, 226 of the same type 228 that are located within a predetermined threshold distance of one another. In additional or alternative implementations, the cluster 233 may be identified to include vehicles of more than one type.

For example, the cluster may be identified to include personal mobility vehicles (e.g., rideable vehicles) of multiple types, such as bicycles and scooters. The computing device 202 may also identify a cluster location 231 associated with the cluster 233. In certain implementations, the cluster location 231 may be identified as one of the locations of the vehicles 218, 222, 226 included in the cluster 233. In additional or alternative implementations, the cluster location 231 may be identified as an average or central location of the vehicles 218, 222, 226 included within the cluster 233.

The computing device 202 may generate the map 210 to depict the cluster 233 at the cluster location 231. For example, the map 210 may include a visual identifier of the cluster 233 at the cluster location 231 (e.g., a visual indicator of the type 228 of the vehicles 218, 222, 226 included within the cluster 233). The map 210 may be generated at a first zoom level 212 that depicts an area 214 surrounding the current location 208. The first zoom level 212 may be selected to include the cluster location 231 of the cluster 233. The zoom level 212 may additionally or alternatively be selected to include visual identifiers at locations of a predetermined quantity of vehicles 220, 224 of a second type 230, 232 different from the first type 228 of vehicles 218, 222, 226 included in the cluster 233. For example, cluster 233 may correspond to vehicles 218, 222, 226 that are scooters and the zoom level 212 may be selected to include a predetermined quantity of vehicles that are automobiles. In additional or alternative implementations, the map 210 may additionally be generated to include visual identifiers of vehicles of a third type and/or a fourth type different from the first and second types. In certain implementations, the user may be able to change the zoom level of the map 210. For example, the first zoom level 210 may display an area 214 and the user may interact with the map to zoom out to a second zoom level that displays an area larger than the area 214 (e.g., a larger area surrounding the current location that includes at least a portion of the area 214). As another example, the user may interact with the map to zoom in to a third zoom level that displays an area smaller than the area 214 (e.g., a smaller area that includes at least a portion of the area 214). In certain implementations, the areas 214 associated with each zoom level may correspond to a geographical area (e.g., a geographic area surrounding the current location 208). In certain instances, the areas 214 may be stored and/or identified as geohashes. For example, as the zoom level of the map 210 changes and the area changes as a result, the geohash describing the area may similarly update dynamically. Furthermore, the zoom levels may be classified into one or more categories, such as one or more of block level, neighborhood level, and city level. The categories may be defined as areas 214 of a predetermined threshold size (e.g., geohashes of one or both of a particular minimum size and particular maximum size). In particular, as zoom levels transition between different categories, the clusters and indicators included on the map may be updated.

In certain implementations, the vehicles 218, 222, 226 included in the cluster 233 and/or the vehicles of the second type may be identified according to preferences and/or past practices of a user associated with the computing device 202. For example, the user database 206 may store user profiles 254 in association with user preferences 256. The user profiles 254 may identify users and/or associated accounts and computing devices (e.g., computing devices 202). The user preferences 256 may indicate frequently-utilized vehicle types for the associated user profile 254 and/or infrequently-utilized vehicles types for the associated user profile 254. The user preferences 256 may be indicated by a user associated with the user profile 254. Additionally or alternatively, the user preferences 256 may be determined based on past practices of user associated with the user profile 254 (e.g., vehicles utilized by the user in connection with previously-received transportation). For example, if a user often utilizes scooters when receiving transportation, the user preferences 256 may store data indicating that the user profile 254 is likely to utilize or request scooters for transportation. As another example, if a user infrequently uses buses for transportation, the user preferences 256 may store data indicating that the user profile is unlikely to utilize or request buses for transportation.

The computing device 202 may be implemented as one or more computing devices, including one or more of a smart phone, tablet, wearable computing device, laptop computer, and/or personal computing device. Additionally, the processor 232 and the memory 234 may implement one or more aspects of the computing device 202. For example, the memory 234 may store instructions which, when executed by the processor 232 may perform one or more of the operational features of the computing device 202. Additionally, although not depicted, the vehicle database 204 and/or the user database 206 may contain a processor and a memory that implement one or more operational features of the vehicle database 204 and/or the user database 206.

FIGS. 3A-3D illustrate maps 300, 310, 320, 330 displaying nearby vehicles according to exemplary embodiments of the present disclosure. In the depicted examples, and as shown in the map 300, the nearby vehicles may include six automobiles 302A-F, eight bicycles 304A-H, and six scooters 306A-F. In particular, the map 300 depicts the relative locations of each of the nearby vehicles 302A-F, 304A-H, 306A-F, along with an indication of the current location 308 of the user. As can be seen in the map 300, utilizing separate indications for each vehicle 302A-F, 304A-H, 306A-F results in a visually cluttered map 300, making it difficult to easily identify both the current location 308 and the quantity and type of vehicles 302A-F, 304 A-H, 306A-F located near the current location 308.

Figure 3A:
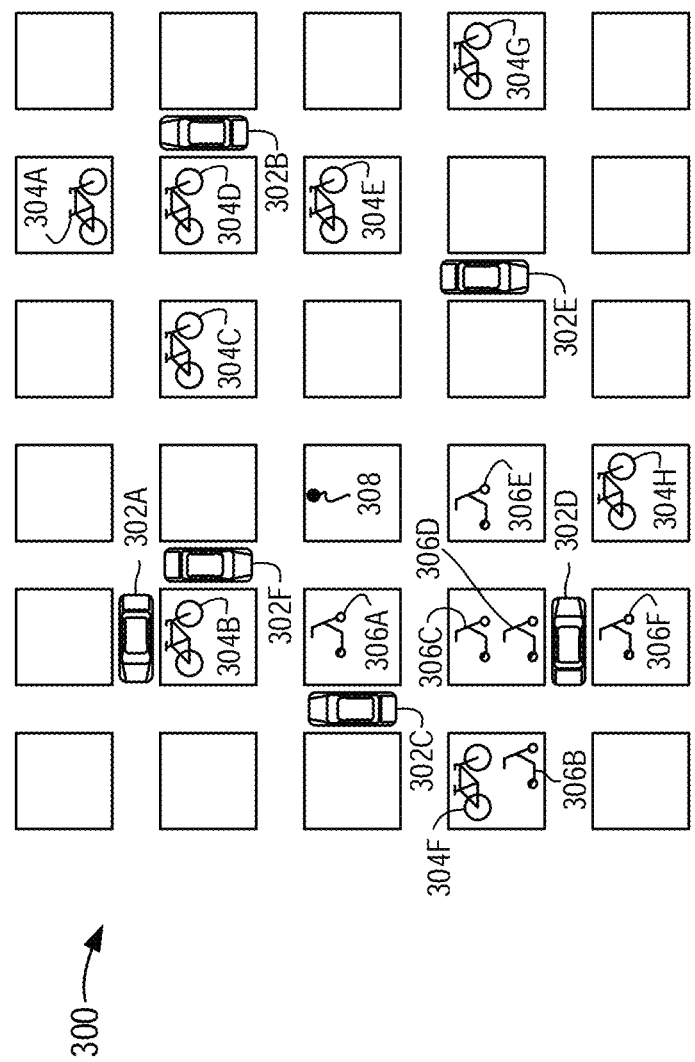
FIGS. 3A-3D illustrate maps displaying nearby vehicles according to exemplary embodiments of the present disclosure.
Figure 3B:
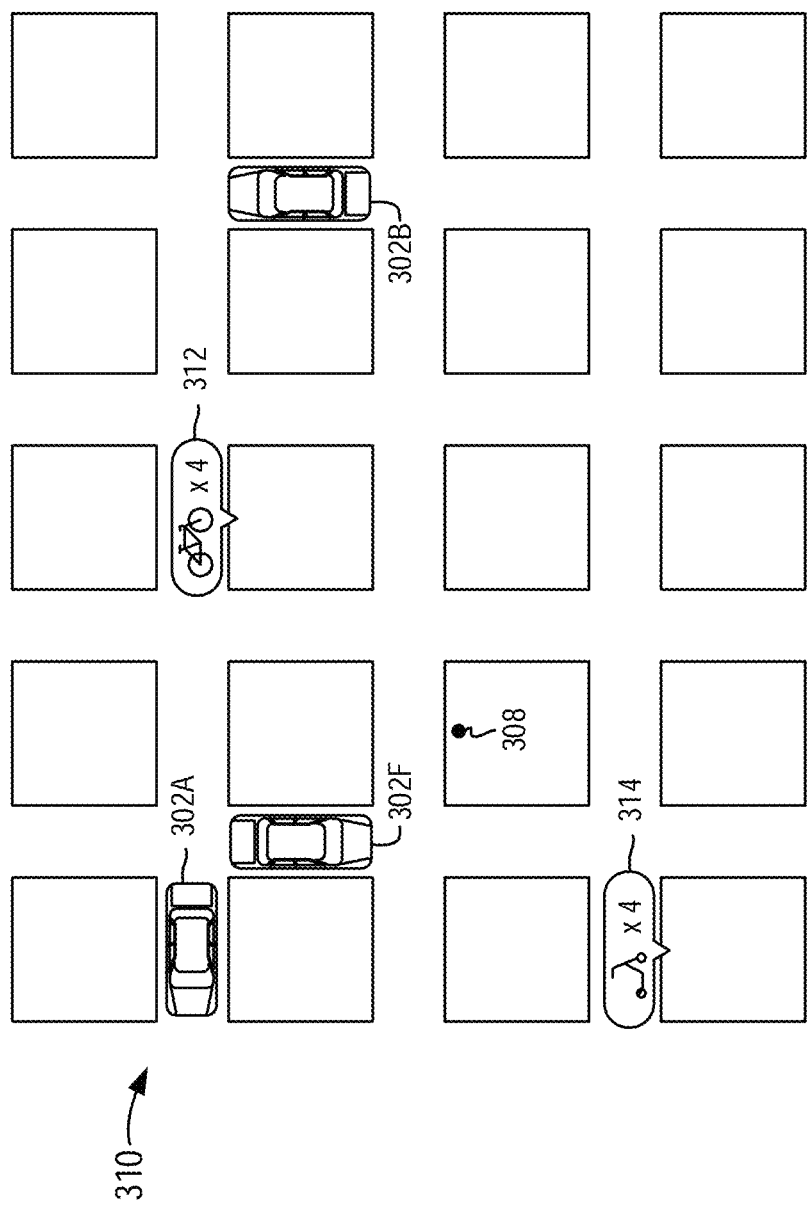

Accordingly, the computing device 202 may generate, based on the identified nearby vehicles 302A-F, 304 A-H, 306A-F, a map that includes clusters including more than one vehicle of a particular type. For example, the maps 310, 320, 330 represent exemplary implementations of the map 210 generated by the computing device 202. In particular, the map 310 may represent an exemplary implementation of the map 210 generated at the first zoom level 212. As can be seen in FIG. 3B, the map 310 is generated at the first zoom level 212 to cover a smaller area surrounding the current location 308 than the map 300. Additionally, the map 310 includes two cluster identifiers 312, 314. The cluster identifiers 312, 314 may visually identify clusters of two or more vehicles of the same type. For example, the cluster identifier 312 visually identifies four of the bicycles 304A, C-E located near the current location 308. As another example, the cluster identifier 314 visually identifies four of the scooters 306A, C-E located near the current location 308.

In generating the map 310, the computing device 202 may identify vehicles as forming a cluster if the vehicles are located within a predetermined distance of one another. For example, the computing device 202 may identify the bicycles 304A, C-E as forming a cluster because the bicycles 304A, C-E are located within two blocks of one another. Similarly, the computing device 202 may identify the scooters 306A, C-E as forming a cluster because the scooters 306A, C-E are located within two blocks of one another. The computing device 202 may utilize additional or alternative clustering strategies, including, e.g., moving average clustering, k-means clustering, mean-shift clustering, density-based spatial clustering of applications with noise, and expectation-maximization clustering.

Figure 3C:
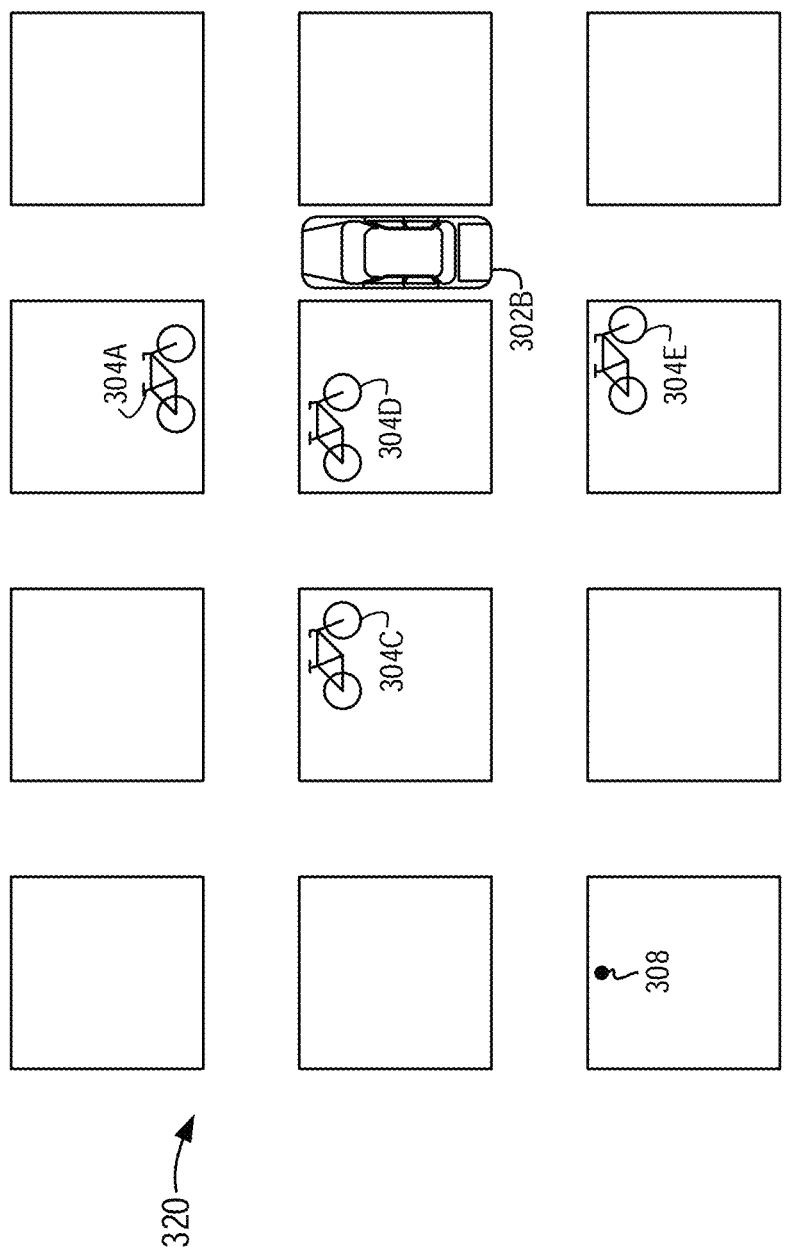
Figure 3D:
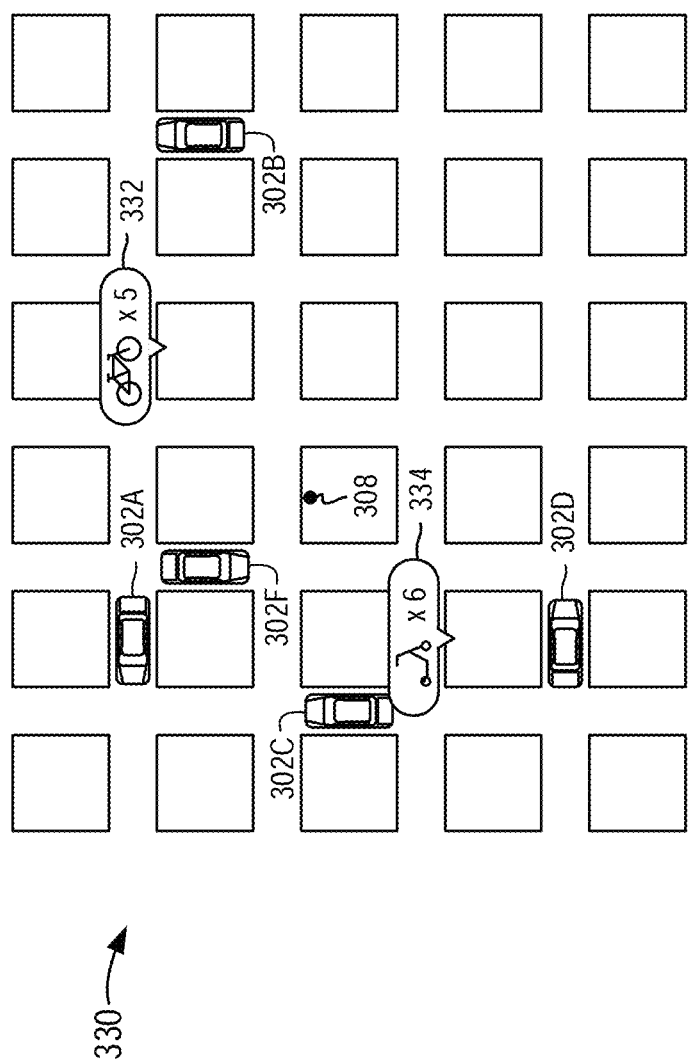

In certain implementations, the clusters may be identified differently based on the zoom level of a displayed map. For example, the predetermined distance used to identify the clusters may be altered according to a zoom level of the displayed map. As one example, the map 310 may be generated at a first zoom level and FIG. 3C depicts a map 320 with a second zoom level that depicts a smaller area than the first zoom level of the map 310. As depicted, the smaller area depicted by the second zoom level at least partially overlaps the area depicted by the first zoom level. At the closer zoom level, the bicycles 304A, C-E may be more easily distinguished if depicted individually. Therefore, when generating the map 320, the computing device 202 may remove the bicycles 304A, C-E from the cluster, remove the cluster identifier 312, and may display separate visual indications for each bicycle 304A, C-E. As another example, FIG. 3D depicts a map 330 with a third zoom level that depicts a larger area than the first zoom level map 310. As depicted, the larger area depicted by the third zoom level partially overlaps the area depicted by the first zoom level. At the third zoom level, the depicted area may encompass additional vehicles and, when generating the map 330, the computing device 202 may update the clusters from the map 310 to include at least a portion of the additional vehicles. For example, the computing device 202 may add the bicycle 304G to the cluster identified by the cluster identifier 312 and may add the scooters 306B, F to the cluster identified by cluster identifier 314. Accordingly, as depicted, the cluster identifier 332 corresponds to five bicycles 304A, C-E, G, and the cluster identifier 334 corresponds to six scooters 306A-F. Therefore, for further zoom levels, the map 310 may include information regarding additional vehicles (e.g., additional scooters and/or additional bicycles) without increasing the number of visual indicators and visual complexity of the map 310.

In addition to updating the clusters, maps 310, 320, 330 with different zoom levels may display different quantities of visual identifiers. In certain implementations, more visual identifiers of the depicted types vehicles may be presented for further zoom levels than for closer zoom levels. For example, the map 310 depicts clusters of bicycles and scooters, but displays individual identifiers for multiple automobiles located in the depicted area. In particular, the map 310 depicts three visual identifiers for the automobiles 302A, B, F. However, for the second zoom area of the map 320, only a single visual identifier of the automobile 302B is depicted and for the third zoom level of the map 330, visual identifiers for the automobiles 302C, D are depicted. The computing device 202 may select the quantity of other types of vehicles (e.g., vehicles not included in a cluster, such as automobiles) to display based on the zoom level of the map. In certain implementations, a subset of the vehicles located within a depicted area may be identified for display with corresponding visual identifiers. For example, automobiles 302A-D, F may be selected for display on the map 330 and automobile 302E may be not be selected for display (but the location of the automobile 302E may continue to be tracked for potential future display on the map). In such implementations, the subset of the vehicles may be selected to include a predetermined quantity of the vehicles, and the predetermined quantity may change based on the zoom level of the map 310, 320, 330.

The zoom level of a map (e.g., a map depicted by the computing device 202) may change based on a user interaction. For example, a user may interact with the computing device 202 displaying the map 310, 320, 330 and may input a user interaction (e.g., a touch gesture, movement gesture, hardware or software key press) to change between zoom levels. In response to the detected user interaction, the computing device 202 may change the zoom level of the depicted map 310, 320, 330. For example, the computing device 202 may display the map 310 and may detect a user interaction where the user touches the screen and separates their fingers (e.g., a "pinch out" gesture). In response, the computing device 202 may transition the map 310 to a map with a closer zoom level, such as the map 320. As the computing device 202 transitions to the closer zoom level, the cluster identifier 312 may be separated into the individual visual identifiers of the bicycles 304A, C-E. As another example, the computing device 202 may detect a user interaction where the user touches the screen and brings their fingers together (e.g., a "pinch in" gesture). In response, the computing device 202 may transition the map 310 to a map with a further zoom level, such as the map 330. As the computing device 202 transitions to the further zoom level, the cluster identifiers 312, 314 may be updated to the cluster identifiers 332, 334. In practice, the map may continuously transition between the zoom levels. For instance, in the preceding examples, as the user separates or brings together their fingers, the computing device may continuously update zoom level displayed by the map, including continuously updating the vehicles and cluster identifiers displayed on the map. In particular, as the user transitions between two zoom levels (e.g., the first and second zoom levels), the map may transition between multiple, intervening zoom levels. The computing device 202 may update the clusters (e.g., by adding or removing vehicles to the clusters) and may update the vehicles displayed for each of the intervening zoom levels (e.g., according to the techniques discussed herein). In instances where a depicted map transitions between different zoom levels and vehicles are added to or removed from clusters, the updates to the clusters may be indicated visually with, e.g., animations showing individual vehicle indicators splitting off from or being added to cluster identifiers.

As depicted, the cluster identifiers 312, 314, 332, 334 include a pictorial indicator identifying the type of vehicle and a numerical indicator of the quantity of vehicles that identifies the quantity of vehicles included in the corresponding cluster. In certain implementations, the cluster identifiers may include additional information and/or indicators and/or may omit certain representations. For example, the cluster identifiers 312, 314, 332, 334 may include the pictorial indicator and omit the numerical indicator. As another example, the cluster identifiers 312, 314, 332, 334 may include pictorial indicators and/or numerical indicators that differ from those depicted in FIGS. 3B, 3D.

Figure 4A:
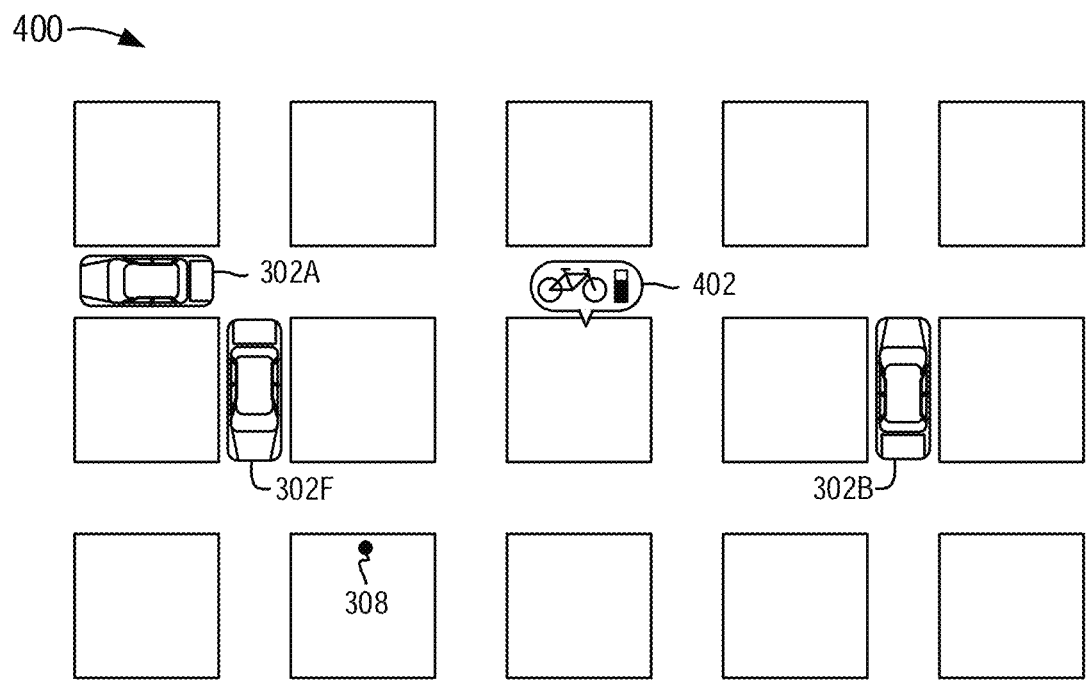
FIGS. 4A-4C illustrate maps with status indicators according to exemplary embodiments of the present disclosure.
Figure 4B:
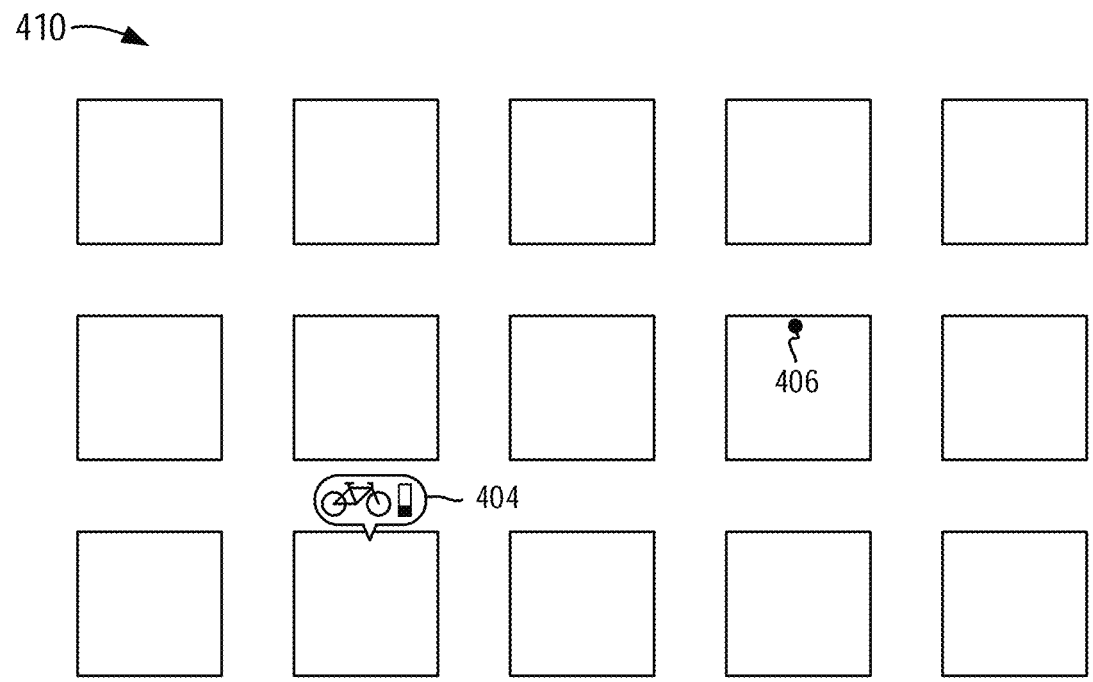
Figure 4C:
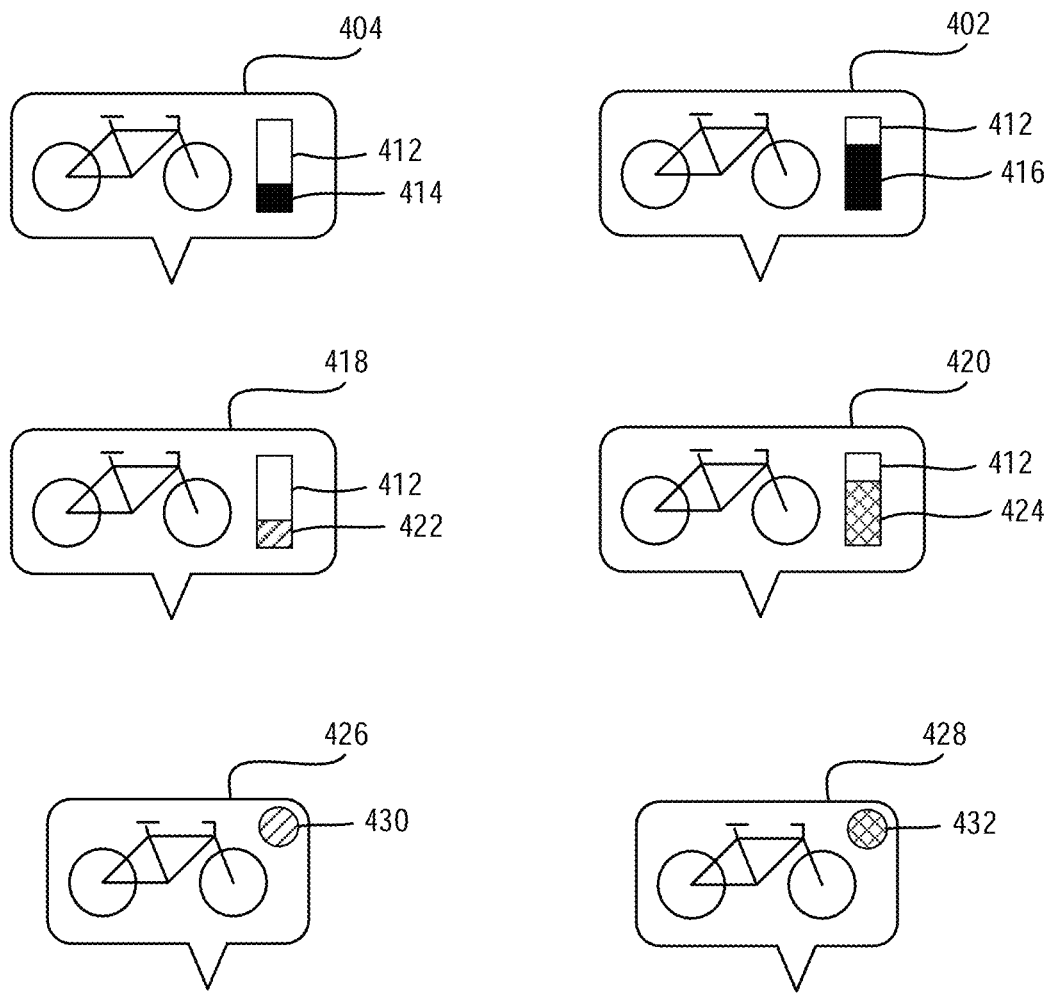

As a further example, FIGS. 4A-4B illustrate maps 400, 410 with status indicators according to exemplary embodiments of the present disclosure. In particular, the maps 400, 410 include cluster identifiers 402, 404 that have status indicators 412 for the corresponding vehicles. The cluster identifiers 402, 404 are depicted in greater detail in FIG. 4C. The status indicators 412 may provide a visual indication of a usability status of associated vehicles. For example, the cluster identifiers 402, 404 as depicted correspond to bicycles and the usability status may indicate a total quantity of available bicycles and/or docks at a station compared to a capacity of the station (e.g., a quantity of available bicycles docked at a station at the location indicated by the cluster identifier 402 and/or a quantity of available docks at a station at the location indicated by the cluster identifier 402). As can be seen in greater detail in FIG. 4C, the status indicator 412 may include a bar 412 that can be filled to different levels to indicate the usability status. For example, a full bar may indicate that all of the docks at a station include available bicycles or that all of the docks are available to deposit a bicycle that is in use. As depicted, the mostly full bar 416 of cluster indicator 402 may indicate that most of the docks at the station have available bikes and the mostly empty bar 414 of the cluster indicator 404 may indicate that less than half of the docks are available to deposit bicycles. Other types of status indicators may be used. For example, the cluster identifiers 418, 420 include bars 422, 424 that change colors. For example, in addition to changing fill levels, the bar 422 may change from a first color (e.g., red) when less than half full (e.g., less than 50% full, less than 33% full) to a bar 424 of a second color (e.g., green when more than half full (e.g., more the 50% full, more than 66% full). As a further example, the cluster identifiers 426, 428 that similarly change from the first color to the second color. In still further implementations, the cluster identifiers may change to a third color (e.g., yellow) when about half full (e.g., more than 33% full and less than 66% full).

In certain implementations, the usability status may additionally or alternatively correspond to a quantity of available vehicles or docks compared to a predicted future demand for vehicles or docks at the location (e.g., where a full bar indicates that there are sufficient vehicles or docks to meet the predicted future demand). In still further implementations (e.g., implementations where the corresponding vehicles are electrically-powered bicycles or electrically-powered scooters), the usability status may correspond to a battery charge level of one or more of the corresponding vehicles (e.g., an average battery charge level of the vehicles, a highest battery charge level among the vehicles). In additional implementations, the usability status may indicate whether one or more of the associated vehicles are reserved (e.g., reserved for use by another user) and/or a type of automobile (e.g., a number of available seats in a vehicle, a trim level of the vehicle).

The usability status may be updated dynamically in real time based on changes in available vehicles or changes in vehicle locations. For example, as new vehicles become available, or as docks become available or get utilized, the status indicators may update to indicate the updated status (e.g., amount of available vehicles/docks). Additionally or alternatively, the usability status depicted by the status indicators of the cluster identifiers 402, 404 may change upon detecting a change to a current ride status of a user associated with the computing device. For example, before a user has begun a ride, the usability status may indicate the availability of bicycles in a given cluster or at a given location. For example, the cluster identifier 402 depicted in the map 400 may indicate a quantity of available bicycles in the cluster corresponding to the cluster identifier 402. However, once a user has accessed a vehicle and begun a ride (e.g., begun riding a bicycle or scooter), the usability status may be updated to instead reflect a quantity of available docks or vehicle storage locations (e.g., bicycle racks) in a given area. For example, the cluster identifier 404 depicted in the map 410 may indicate the quantity of available docks in the cluster corresponding to the cluster identifier 404 (e.g., near a user's destination location 406). Additionally or alternative, in certain implementations, the pictorial indicator of the cluster identifier 404 may change depending on the user's current ride status. For example, instead of depicting a bicycle, the pictorial indicator may depict a bike dock or station to indicate that the usability status has changed.

Other portions of the map may similarly respond to changes in rider status. For example, the map 400 includes visual indicators for the automobiles 302A, B, F so that the user has the option of viewing and/or selecting a particular automobile for transport, or so that the user is made aware that automobiles are available for requested transport if desired. However, once a user has begun utilizing a different vehicle (e.g., a bicycle and/or a scooter), the map 410 may not include visual indicators of automobiles and may instead include visual indicators of where a user can deposit the bicycle and/or scooter (e.g., at docks or approved drop-off locations), such as the cluster identifier 404. Similarly, the map may include visual identifiers of popular destinations. Upon selecting a visual identifier of a popular destination, the map may be updated to display information regarding the popular destination (e.g., store hours, information, reviews). Further, the map may be updated to display identifiers of vehicles the user may use for transportation to the popular destination.

Responsive cluster identifier 402, 404 and maps 400, 410 may limit the amount of processing and presentation of irrelevant information to a user and may preserve limited screen space for the presentation of important and relevant information. In this way, maps may be both easier and faster to understand and visually parse while also being faster and simpler to update, as information that is not relevant does not have to be generated, updated, or displayed. Accordingly, such responsive map designs may improve the usability of map in multi-modal transportation settings.

Figure 5A:
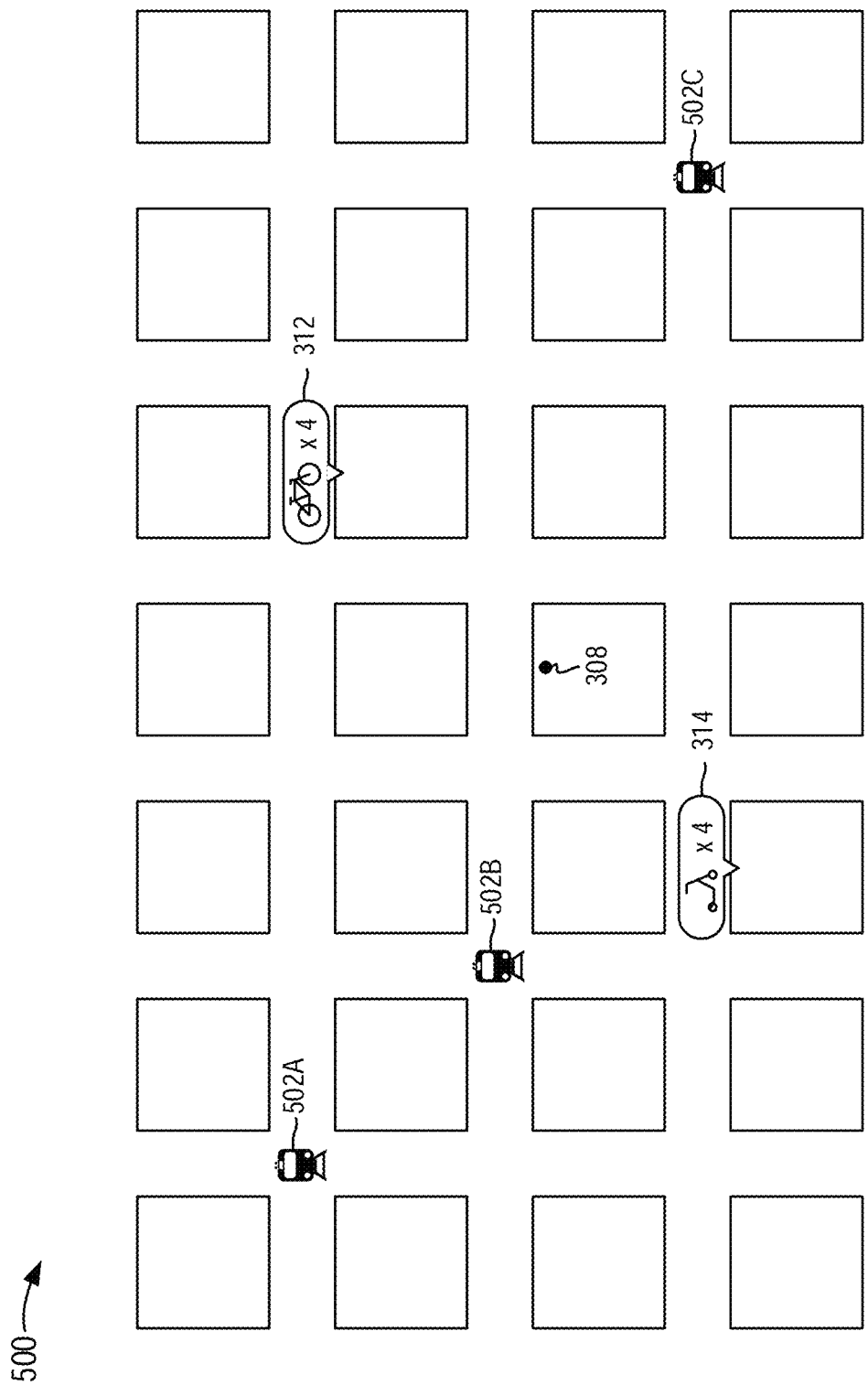
FIGS. 5A-5C illustrate maps displaying nearby vehicles according to exemplary embodiment of the present disclosure.
Figure 5B:
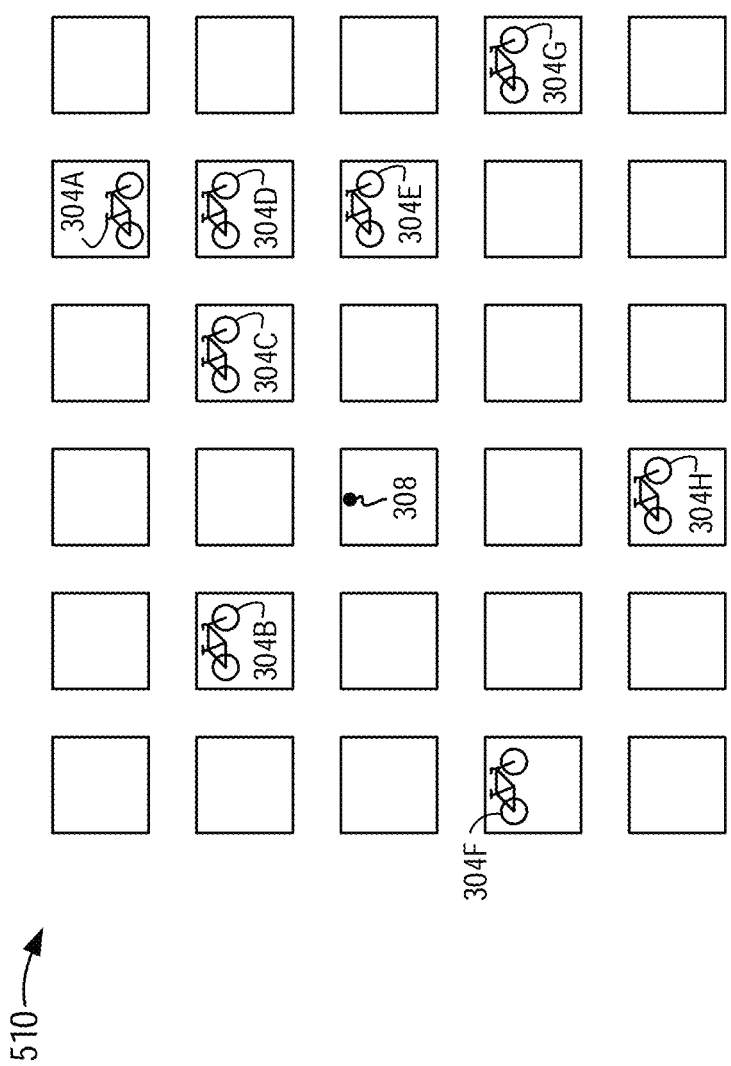
Figure 5C:
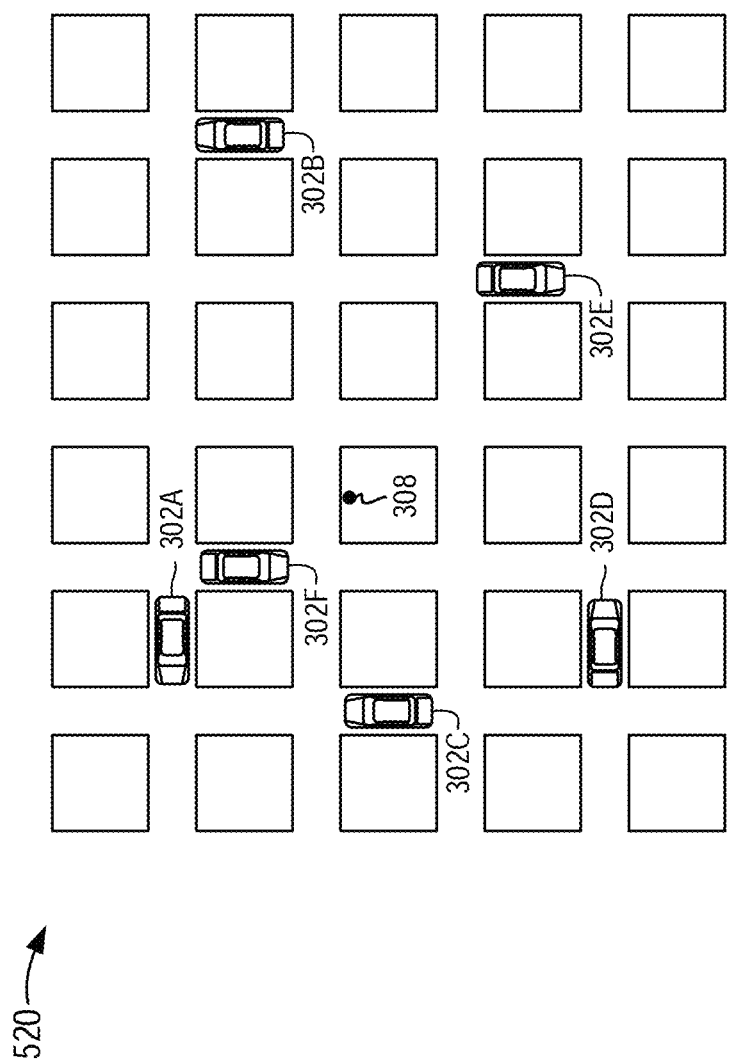

FIGS. 5A-5C illustrate maps 500, 510, 520 displaying nearby vehicles according to exemplary embodiments of the present disclosure. The maps 500, 510, 520 may be exemplary implementations of the map 210 generated and displayed by the computing device 202. In particular, the map 500 may be an alternative implementation of the map 300. For example, the computing device 202 may select the vehicles for display according to user preferences 256 associated with a user of the computing device 202. In certain implementations, the user preferences 256 may indicate that the user infrequently requests transportation by automobile and/or that the user more frequently utilizes transportation by train, bicycle, and scooter than transportation by automobile. Therefore, the computing device 202 may generate the map 500 to include visual indicators of trains 502A-C (e.g., transit stops serviced by trains) instead of the visual indicators of the automobiles 302A-F included in the map 300. Furthermore, the computing device 202 may select the initial zoom level of the map 500 based on the types of displayed vehicles. For example, the map 500 is depicted at a further zoom level than the map 300, and the computing device 202 may select the further zoom level in response to determining the closest locations of the trains 502A-C. For instance, the computing device 202 may be configured to generate maps such that a predetermined quantity of vehicles (e.g., three vehicles) are displayed in addition to any identified clusters. The computing device 202 may accordingly determine that the trains 502A-C are the three closest trains and may select the further zoom level such that all three of the trains are depicted 502A-C. In additional implementations, the vehicles included in identified clusters may also be identified based on user preferences 256. For example, the computing device 202 may generate a map that includes clusters of automobiles and/or clusters of trains and that depicts individual visual identifiers for bicycles, scooters, and/or buses.

In certain implementations, interacting with a visual indicator on the map may change one or more of the zoom level of the map and the visual indications displayed on the map. For example, from an initial map 500 of the FIG. 5A, a user may tap on or select the cluster identifier 312 corresponding to a subset of the bicycles 304A-H. In response, the computing device 202 may remove visual indicators that do not correspond to the bicycles 304A-H and may instead display individual visual indicators for the bicycles 304A-H that are located nearby, as depicted in the map 510 of FIG. 5B. As another example, from an initial map 310, 320 of FIGS. 3B, 3C, a user may tap on or select a visual indicator associated with an automobile 302A-F. In response, the computing device 202 may remove visual indicators that do not correspond to the automobiles 302A-F and instead display individual visual indicators for additional automobiles 302A-F, as shown in the map 520 of the FIG. 5B. As a further example, tabs may be displayed in addition to a map (e.g., at the bottom of a user interface that includes the map). The tabs may depict visual identifiers of particular modalities (e.g., a visual indicator of a bicycle, an automobile, a train, and/or a scoter), and each tab may correspond to one or more particular modalities. If the computing device 202 detects a user interaction selecting one of the tabs, the displayed map may be updated based on the corresponding modality of the tab. For example, from an initial map 500 of the FIG. 5A, a user may tap a tab corresponding to bicycles. In response, the computing device 202 may transition to the map 510 of FIG. 5B.

In certain implementations, the computing device 202 may additionally or alternatively adjust the zoom level based on the type of vehicle selected. For example, if the computing device 202 initially displayed the map 500 and a user selects the cluster identifier 312, the computing device 202 may adjust the map to the closer zoom level of the map 510 to more clearly depict each of the visual indicators of the bicycles 304A-H. As another example, if the computing device 202 is displaying the map 320 and a user taps or selects the visual indicator of the automobile 302B, the computing device 202 may adjust the map to the further zoom level of the map 520 to depict a larger area that includes additional automobiles 302A-F.

Further, in any of the above implementations, the computing device 202 may adjust one or more of the clusters, individual vehicle identifiers, and zoom levels based on more than one selected type of vehicle. For example, a user may select both bicycles and buses and the map may adjusted to include a predetermined number of clusters or identifiers of bikes and/or buses. In certain implementations, based on the user's selection, the zoom level may be adjusted to properly include the predetermined number clusters or identifiers.

Figure 6:
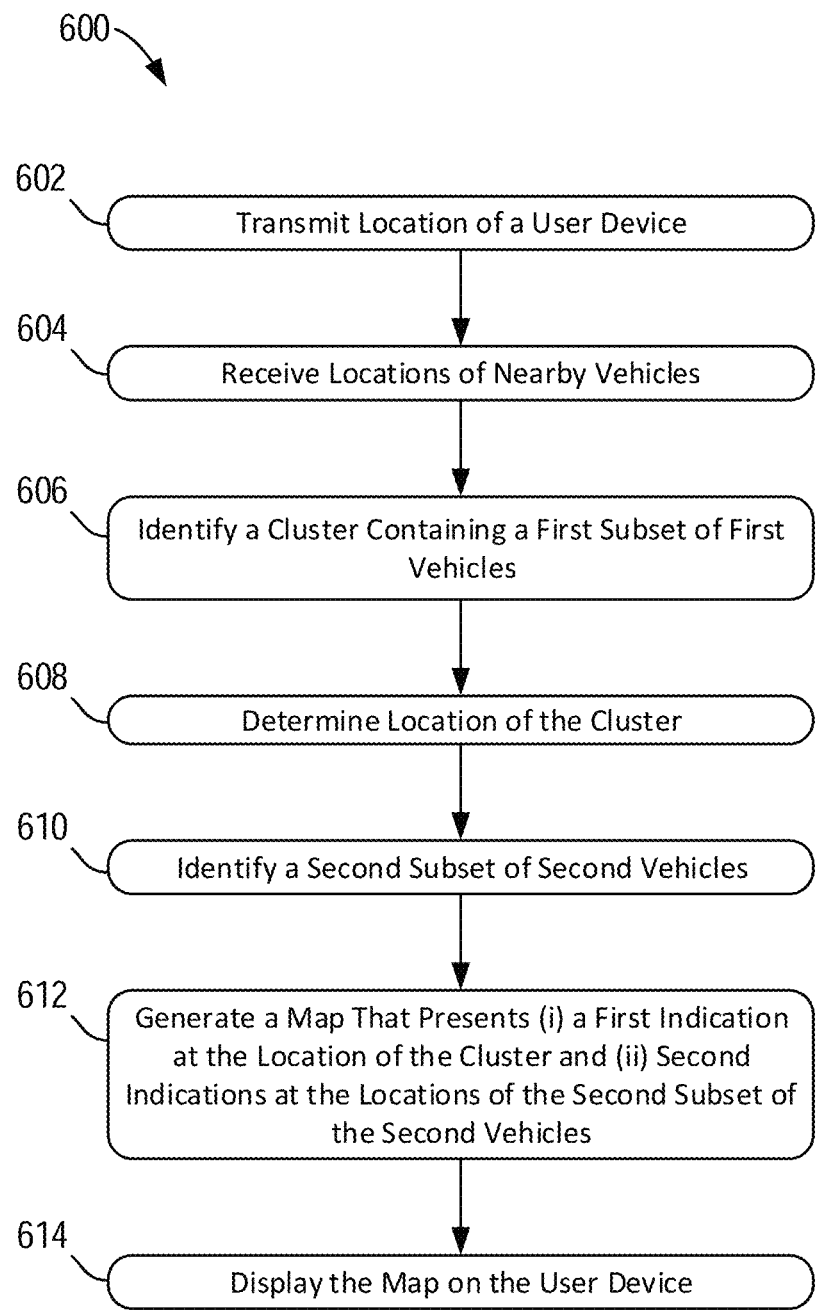
FIG. 6 illustrates a method for identifying and selecting nearby vehicles for display according to an exemplary embodiment of the present disclosure.

FIG. 6 illustrates a method 600 for identifying and selecting nearby vehicles for display according to an exemplary embodiment of the present disclosure. The method 600 may be performed by a computer system to receive and process the locations of multiple types of vehicles located near a user requesting transportation services prior to displaying at least a subset of the locations to the user. For example, the method 600 may be performed by the computing device 202 to display one or more of the maps 300, 310, 320, 400, 410, 500, 510, 520. The method 600 may also be implemented by a set of instructions stored on a computer readable medium that, when executed by a processor, cause the computer system to perform the method 600. For example, all or part of the method 600 may be implemented by the processor 232 and the memory 234. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with transmitting a location of a user device (block 602). For example, the computing device 202 may determine a current location 208, 308 of the computing device 202 and may transmit the location to the vehicle database 204. In response, the vehicle database 204 may identify nearby vehicles 216 that are located near the current location 208, 308. The nearby vehicles 216 may include vehicles of different types 228, 230, 232, 240, such as automobiles, buses, trains, bicycles, and scooters. In certain implementations, the vehicles 218, 220, 222, 224, 226 included within the nearby vehicles 216 may be identified based on predetermined distances, which may vary for different types of vehicles and/or according to user preferences 256 or past practices associated with a user of the computing device 202. For example, a modality-specific predetermined distance used to identify nearby scooters or transit stops for trains and/or buses (e.g., a first predetermined distance) may be shorter than a modality-specific predetermined distance used to identify nearby automobiles (e.g., a second predetermined distance). As another example, a user-specific predetermined distance used to identify nearby bicycles for a first user (e.g., a third predetermined distance) may be shorter than a user-specific predetermined distance used to identify nearby bicycles for a second user (e.g., a fourth predetermined distance), e.g., because the second user has previously demonstrated a greater willingness to walk further to access an available bicycle.

The locations of the nearby vehicles may then be received by the user devices (block 604). For example, the computing device 202 may receive, from the vehicle database 204, indications of the nearby vehicles 216, including locations 248, 250, 252 of each of the vehicles 218, 220, 222, 224, 226 included within the nearby vehicles 216. The computing device 202 may additionally receive indications of a type 228, 230, 232, 240 for at least a subset of the nearby vehicles 216. In particular, the nearby vehicles 216 may include multiple vehicles of different types. For example, the nearby vehicles 216 may include first vehicles 218, 222, 226 of a first type 228 and second vehicle(s) 220 of a second type 230. In certain implementations, the nearby vehicles 216 may further include third vehicle(s) 224 of a third type 232 and/or fourth vehicles of a fourth type.

A cluster may then be identified that contains at least a first subset of the first vehicles (block 606). For example, the computing device 202 may identify a cluster 233 containing at least a subset of the first vehicles 218, 222, 226 of the first type 228. In certain implementations, the cluster 233 may be identified to include a subset of the first vehicles 218, 222, 226 located within a predetermined distance of one another. In additional or alternative implementations, the cluster 233 may be identified according to other clustering strategies, as discussed above. The first type 228 of vehicles included within the cluster may be identified according to one or more heuristics. For example, in certain implementations, bicycles and scooters may typically be more densely distributed near users. Accordingly, bicycles and scooters may be more likely to be included in clusters to further reduce the quantity of visual indicators included on the map 210 generated by the computing device 202.

Additionally or alternatively, the first type of vehicles for inclusion within the cluster may be identified according to user preferences 256 associated with a user of the computing device 202. For instance, the user preferences 256 may indicate types of vehicles that a user takes less frequently, which may be determined based on previous user transportation behavior. In one instance, the user preferences 256 may indicate that the user frequently takes bicycles, occasionally takes scooters, and rarely requests transportation by automobile. Because the user rarely utilizes automobiles, the computing device 202 may omit visual indications of automobiles from the map 210, but may include at least one visual indication of scooters, which the user does occasionally utilize. In such instances, therefore, the computing device 202 may identify scooters for inclusion within the cluster.

In still further implementations, the types of vehicles included in the cluster may be identified based on a predicted destination and/or travel distance for a user. For example, a user's destination may be predicted based on the time of day as compared to the times of previous transportation requests received from the user. For example, at certain times of day (e.g., morning or evening), a user may typically submit transportation requests for transportation to a particular destination (e.g., home or work). Therefore, at these times of day, the user may be predicted to travel to the destination that is typically requested. The user may typically utilize particular types of vehicles to travel between the current location 208, 308 and the predicted destination, or to travel the predicted travel distance. The computing device 202 may select types of vehicles that are used less frequently to travel to the predicted destination or to travel the predicted travel distance for the cluster. For example, a user may be predicted to travel to work and may typically take the bus when travelling to work, but may occasionally utilize a bicycle to do so (e.g., as indicated by associated user preferences 256). In such instances, based on the user preferences 256 and the predicted destinations, the computing device 202 may identify bicycles as a type of vehicle for which a cluster should be identified.

Additionally or alternatively, the types of vehicles included in the cluster may be identified based on road conditions or weather. For example, previous travel requests associated with the user may indicate that the user frequently uses trains or bicycles for transportation when road congestion is significant. Therefore, if road congestion is significant, the computing device 202 may identify one or both of trains and bicycles as a type of vehicle for which a cluster should be identified. As another example, previous travel requests associated with the user may indicate that the user frequently uses automobiles or buses for transportation when weather conditions are rainy and/or windy. Therefore, if weather conditions are rainy or windy when generating a map, the computing device 202 may identify automobiles and/or buses as a type of vehicle for which a cluster should be identified.

In still further instances, the types of vehicles included in the cluster may be identified based on market conditions. For example, if there are many vehicles of a first type available (e.g., compared to other types of vehicles), then the computing device 202 may identify the first type as a type for which a cluster should be identified. As a further example, if there are few vehicles of a second type available (e.g., compared to other types of vehicles), then the computing device 202 may determine that the second type of vehicles should not be included on a generated map and may therefore determine that a cluster should not be identified for the second type of vehicle.

In certain implementations, the computing device 202 may identify more than one cluster of the first type 228 of vehicle. For example, and referring to the vehicles depicted in the map 300 of FIG. 3A, the computing device 202, in addition to identifying a first cluster of the bicycles A, C-E, G in a first location and may identify a second cluster including the bicycles 304B, H in a second location. The number of clusters identified for the first type 228 of vehicle may depend on one or more of the locations of the first type 228 of vehicles, a zoom level of the map, and user preferences 256 associated with the user. For example, more clusters may be identified for vehicles that a user uses frequently and/or when there are many vehicles of a particular type located near the user.

In certain instances, vehicles that are located near the user may be excluded from a cluster. For example, there may be ten scooters located near the user, but three of the scooters may not have sufficient battery charge to travel to a user's predicted destination. In particular, based on a battery charge of the scooters, a range of travel may be predicted for each of the ten scooters located near the user. The range of travel may be compared to a travel distance to the predicted destination and, if the range of travel is less than the travel distance, the vehicle may be determined to have an insufficient charge level. Vehicles with insufficient charge levels may therefore be excluded from the cluster, while vehicles with sufficient charge levels may be included within the cluster.

A location for the cluster may then be identified (block 608). For example, the computing device 202 may identify a cluster location 231 for the cluster 233. In certain implementations, the cluster location 231 may be identified as the location of one or more of the vehicles 218, 222, 226 included within the cluster 233. For example, the computing device 202 may identify the cluster location 231 as the location of the vehicle 218, 222, 226 associated with the cluster 233 that is located closest to the current location 208, 308 of the computing device. As another example, the computing device 202 may identify the cluster location 231 as the location of the vehicle 218, 222, 226 that has the highest battery charge level (e.g., for electrically powered vehicles such as bicycles and scooters). In still further examples, the computing device 202 may identify the cluster location 231 as the location of the vehicle 218, 222, 226 that is located closest to the current location 208, 308 and that has a battery charge level greater than or equal to a predetermined threshold (e.g., a predetermined threshold determined to be sufficient to provide transportation to a predicted destination and/or for a predicted travel distance of the user). In additional or alternative implementations, the cluster location 231 may not be identified as the location of one or more of the vehicles 218, 222, 226. For example, the cluster location 231 may be determined to be an average position of the vehicles 218, 222, 226 included within the cluster 233 and/or a predicted location of one of the vehicles 218, 222, 226.

A second subset of second vehicles of a second type may then be identified (block 610). For example, the computing device 202 may identify a second subset of a second type 230 of second vehicles 220. The second type 230 may be identified based on one or more heuristics. For example, automobiles and transit stops (e.g., transit stops associated with trains and/or buses) may typically be distributed further apart and may therefore typically be less amenable to clustering. Accordingly, the computing device 202 may select automobiles, trains, and/or buses as the second type 230. In additional or alternative implementations, the second type 230 may be identified based on user preferences 256. For example, the second type 230 may be selected to include a user's most preferred or most likely type of vehicle. As a specific example, the user preferences 256 may indicate that a user most commonly utilizes bicycles for transportation, and the second type 230 may be selected as bicycles. As another example, where the second type 230 of second vehicles 220 includes buses, the second subset may be selected to include locations (e.g., transit stop locations) associated with bus lines that the user has previously utilized (e.g., as indicated by previous transportation requests from the user). In such examples, the second subset may be additionally or alternatively selected to include bus lines that are on time and/or to exclude bus lines that are delayed. In still further implementations, the second type 230 may be identified based on a predicted destination or travel distance for a user associated with the computing device 202, which may be predicted as described above. For example, if a user is predicted to travel a further distance (e.g., greater than 1-2 miles), the computing device 202 may identify one of automobiles, buses, and trains as the second type 230 of vehicle.

The second subset of second vehicles may be identified to include a predetermined quantity of vehicles selected for display. For example, the second subset may be selected to include five vehicles of the second type 230 or eight vehicles of the second type 230, although other predetermined quantities may be utilized. The predetermined quantity may be determined based on factors including one or more of the zoom level of the map, user preferences 256 associated with a user of the computing device 202, and the quantity of vehicles of the second type located within the depicted area. For example, the predetermined quantity may be dynamically updated on an ongoing basis as the user changes the zoom level of the map. In still further implementations, the vehicles identified for the second subset may be identified based on the quantity of vehicles of the second type 230 located near the current location 208, 308, the locations of vehicles of the second type located near the current location 208, 308, and/or the relative travel directions of vehicle of the second type located near the current location 208, 308. For example, vehicles that are traveling or are predicted to travel away from the current location 208, 308 (e.g., the automobiles 302A, B, E) may not be included in the second subset. As another example, if a vehicle's travel direction indicates that the vehicle will soon leave the geographic area depicted by the map, the vehicle may be excluded from the second subset. Additionally or alternatively, if a vehicle's travel direction indicates that the vehicle will soon enter the geographic area depicted by the map, the vehicle may be included within the second subset (e.g., for early display near an edge of the map). In still further implementations, if there are fewer than the predetermined quantity of vehicles of the second type located near the current location 208, 308, the second subset may be identified to include fewer than the predetermined quantity of vehicles.

A map may then be generated that presents (i) a first indication at the location of the cluster and (ii) second indications at the locations of the second subset of the second vehicles (block 612). For example, the computing device 202 may generate a map 210 to include a first indication of a cluster identifier 312, 314, 332, 334 at the cluster location 231. As described above, the cluster identifier 312, 314, 332, 334 may include one or both of a pictorial identifier of the first type 228 of vehicle and a numerical or other indicator of a quantity of vehicles of the first type 228 included within the cluster 233. In certain implementations, as described above, the computing device 202 may identify more than one cluster 233. For example, the computing device 202 may identify a second cluster containing a third type of vehicle, which may be identified by repeating blocks 604, 606 for the vehicles of the third type. As another example, the computing device 202 may identify a second cluster containing the first type 228 of vehicle (e.g., by identifying multiple clusters 230 at block 606). In such implementations, the computing device 202 may display more than one cluster identifier 312, 314, 332, 334. Relatedly, the computing device 202 may identify clusters of multiple types of vehicles. In certain instances, clusters for different types of vehicles may have locations that are near one another (e.g., that are within a predetermined threshold distance of one another). In such instances, the map may be generated to include an identifier of only one of the clusters. For example, a first cluster may be identified for scooters, a second cluster may be identified for bicycles, and the first and second clusters may be located within a predetermined threshold distance (e.g., 50 feet, 100 feet, 500 feet, 1,000 feet) of one another. The user preferences 256 may indicate that the user utilizes scooters more frequently than bicycles. Therefore, the computing device 202 may only display an indicator of the first cluster. In particular, the computing device 202 may generate a weighted value for each of the first and second clusters. For example, the weighted value may be calculated based on one or more of the user preferences 256, a number of vehicles associated with each of the clusters, and a quality of the vehicles associated with each of the clusters (e.g., a charge level of vehicles associated with the clusters, a timeliness or delay of vehicles associated with the clusters). The computing device 202 may select the cluster associated with the highest weighted value for display.

The computing device 202 may also generate the map 210 to include second indications for the second subset of vehicles of the second type. For example, the computing device 202 may generate the map 210 to include an indication for each of the vehicles of the second type. As a specific example, the maps 310, 500 include separate visual indications for each of the automobiles and buses included within the respective second subset of vehicles. In certain implementations, the computing device 202 may identify a third subset of vehicles for individual display on the map 210. For example, the computing device 202 may identify a third subset of vehicles of a third type for inclusion on the map. As a specific example, the computing device 202 may identify the second subset to include buses (e.g., transit stops serviced by buses) and may further identify a third subset to include trains (e.g., transit stops serviced by trains). In such implementations, the map 210 may be generated to include visual identifiers for each of the second and third subsets of vehicles.

The map may then be displayed on the user device (block 614). For example, the computing device 202 may then display the map 210 for viewing and interaction by a user. In certain implementations, the map 210 may be displayed via an application or via another piece of software on the computing device 202. In additional or alternative implementations, the map 210 may be updated based on changes in marketplace conditions (e.g., to add vehicles that become available, to remove vehicles that become unavailable). In still further implementations, the map 210 may be displayed in a manner that enables the user to interact with the map 210 by, e.g., changing the zoom level and/or selecting one or more of the depicted indications (e.g., the first indication and the second indications). For example, and as explained further above, the computing device 202 may detect a user interaction with the map 210 changing the zoom level of the map 210 and may dynamically update the cluster 233 (e.g., the vehicles included or excluded from the cluster 233) as the user changes the zoom level. For instance, the user may change the zoom level of the map 210 to a closer zoom level that depicts a smaller area and the computing device 202 may remove vehicles from the cluster 233 that are not located in the smaller area. Similarly, the user may change the zoom level to a further zoom level that depicts a larger area and the computing device 202 may add vehicle to the cluster 233 that are located in the larger area and/or may identify additional cluster(s) that include vehicles located in the larger area (e.g., by repeating blocks 606, 608). Similarly, the computing device 202 may dynamically update the second subset of vehicles based on changes to the zoom level by, e.g., increasing the predetermined quantity of second vehicles for further zoom levels, decreasing the predetermined quantity of second vehicles for closer zoom levels, and/or changing the vehicles included within the second subset of vehicles based on the changed zoom level. In particular, the vehicles included in the cluster 233 and/or the second subset of vehicles may be updated to maintain the information density (e.g., total number of visual indicators) within a desired range (e.g., between 5 and 20 visual indicators, between 5 and 15 visual indicators).

The computing device 202 may also detect that the user has selected a particular visual indication (e.g., a cluster identifier 312, 314, 332, 334, a visual identifier of one of the second subset of vehicles, and/or a tab identifier associated with a particular type of vehicles). In response, the computing device 202 may adjust the map 210 to display additional vehicles of the same type as the selected visual indication, such as in the maps 510, 520. In still further implementations, one or more of the vehicles included in the first and/or second subset of vehicles may be capable of autonomous or remotely-controlled relocation (e.g., autonomous automobiles and/or autonomous/remotely-controlled bicycles or scooters). In such instances, upon detecting that a user has selected an indication corresponding to such a vehicle, the computing device 202 may present an option to the user to have the vehicle relocate closer to the current location 208, 308. If the user approves of the presented option, the computing device 202 may cause the vehicle to relocate, e.g., by transmitting a signal to the vehicle causing the vehicle to autonomously relocate and/or by displaying an interface enabling the user to remotely control the vehicle to relocate. In certain implementation, such relocation options may only be presented if the user is located within a predetermined distance of the vehicle (e.g., 500-1,000 feet).

Figure 7:
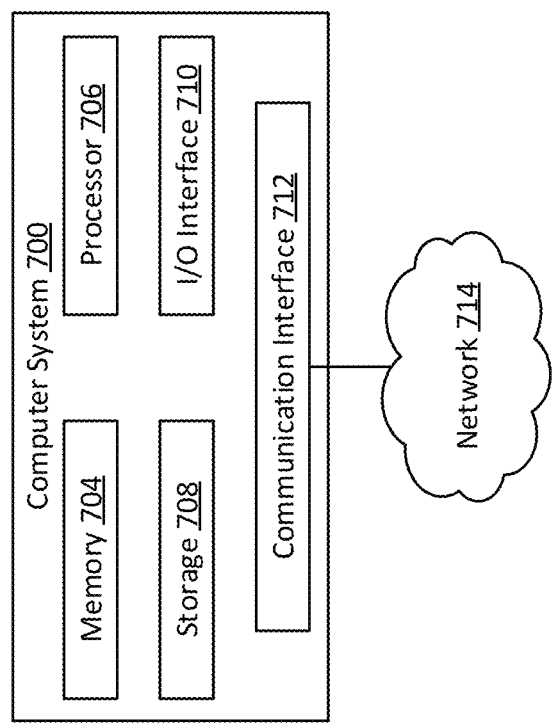
FIG. 7 illustrates a computer system according to an exemplary embodiment of the present disclosure.

FIG. 7 illustrates an example computer system 700 that may be utilized to implement one or more of the devices and/or components of FIG. 2, such as the computing device 202. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates the computer system 700 taking any suitable physical form. As example and not by way of limitation, the computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 706, memory 704, storage 708, an input/output (I/O) interface 710, and a communication interface 712. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 706 includes hardware for executing instructions, such as those making up a computer program. As an example and not by way of limitation, to execute instructions, the processor 706 may retrieve (or fetch) the instructions from an internal register, an internal cache, memory 704, or storage 708; decode and execute the instructions; and then write one or more results to an internal register, internal cache, memory 704, or storage 708. In particular embodiments, the processor 706 may include one or more internal caches for data, instructions, or addresses. This disclosure contemplates the processor 706 including any suitable number of any suitable internal caches, where appropriate. As an example and not by way of limitation, the processor 706 may include one or more instruction caches, one or more data caches, and one or more translation lookaside buffers (TLBs). Instructions in the instruction caches may be copies of instructions in memory 704 or storage 708, and the instruction caches may speed up retrieval of those instructions by the processor 706. Data in the data caches may be copies of data in memory 704 or storage 708 that are to be operated on by computer instructions; the results of previous instructions executed by the processor 706 that are accessible to subsequent instructions or for writing to memory 704 or storage 708; or any other suitable data. The data caches may speed up read or write operations by the processor 706. The TLBs may speed up virtual-address translation for the processor 706. In particular embodiments, processor 706 may include one or more internal registers for data, instructions, or addresses. This disclosure contemplates the processor 706 including any suitable number of any suitable internal registers, where appropriate. Where appropriate, the processor 706 may include one or more arithmetic logic units (ALUs), be a multi-core processor, or include one or more processors 706. Although this disclosure describes and illustrates a particular processor, this disclosure contemplates any suitable processor.

In particular embodiments, the memory 704 includes main memory for storing instructions for the processor 706 to execute or data for processor 706 to operate on. As an example, and not by way of limitation, computer system 700 may load instructions from storage 708 or another source (such as another computer system 700) to the memory 704. The processor 706 may then load the instructions from the memory 704 to an internal register or internal cache. To execute the instructions, the processor 706 may retrieve the instructions from the internal register or internal cache and decode them. During or after execution of the instructions, the processor 706 may write one or more results (which may be intermediate or final results) to the internal register or internal cache. The processor 706 may then write one or more of those results to the memory 704. In particular embodiments, the processor 706 executes only instructions in one or more internal registers or internal caches or in memory 704 (as opposed to storage 708 or elsewhere) and operates only on data in one or more internal registers or internal caches or in memory 704 (as opposed to storage 708 or elsewhere). One or more memory buses (which may each include an address bus and a data bus) may couple the processor 706 to the memory 704. The bus may include one or more memory buses, as described in further detail below. In particular embodiments, one or more memory management units (MMUs) reside between the processor 706 and memory 704 and facilitate accesses to the memory 704 requested by the processor 706. In particular embodiments, the memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory implementations, this disclosure contemplates any suitable memory implementation.

In particular embodiments, the storage 708 includes mass storage for data or instructions. As an example and not by way of limitation, the storage 708 may include a hard disk drive (HDD), a floppy disk drive, flash memory, an optical disc, a magneto-optical disc, magnetic tape, or a Universal Serial Bus (USB) drive or a combination of two or more of these. The storage 708 may include removable or non-removable (or fixed) media, where appropriate. The storage 708 may be internal or external to computer system 700, where appropriate. In particular embodiments, the storage 708 is non-volatile, solid-state memory. In particular embodiments, the storage 708 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 708 taking any suitable physical form. The storage 708 may include one or more storage control units facilitating communication between processor 706 and storage 708, where appropriate. Where appropriate, the storage 708 may include one or more storages 708. Although this disclosure describes and illustrates particular storage, this disclosure contemplates any suitable storage.

In particular embodiments, the I/O Interface 710 includes hardware, software, or both, providing one or more interfaces for communication between computer system 700 and one or more I/O devices. The computer system 700 may include one or more of these I/O devices, where appropriate. One or more of these I/O devices may enable communication between a person (i.e., a user) and computer system 700. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 710 may include one or more device or software drivers enabling processor 706 to drive one or more of these I/O devices. The I/O interface 710 may include one or more I/O interfaces 710, where appropriate. Although this disclosure describes and illustrates a particular I/O interface, this disclosure contemplates any suitable I/O interface or combination of I/O interfaces.

In particular embodiments, communication interface 712 includes hardware, software, or both providing one or more interfaces for communication (such as, for example, packet-based communication) between computer system 700 and one or more other computer systems 700 or one or more networks 714. As an example and not by way of limitation, communication interface 712 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 714 and any suitable communication interface 712 for the network 714. As an example and not by way of limitation, the network 714 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 712 for any of these networks, where appropriate. Communication interface 712 may include one or more communication interfaces 712, where appropriate. Although this disclosure describes and illustrates a particular communication interface implementations, this disclosure contemplates any suitable communication interface implementation.

The computer system 702 may also include a bus. The bus may include hardware, software, or both and may communicatively couple the components of the computer system 700 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Aspects of the present disclosure may be performed by entities and systems configured to provide transportation. For example, transportation providers may implement one or more of the above-described systems and methods. Transportation providers may include transportation networking companies (TNCs). TNCs may implement a transportation matching system that matches transportation requests with a dynamic transportation network of vehicles. In certain instances, the vehicles may include road-going vehicles and/or personal mobility vehicles. In some examples, some of the vehicles may be standard commercially available vehicles and some of the vehicles may be owned and/or operated by individuals. In some implementations, the vehicles may additionally or alternatively be autonomous (or partly autonomous). Accordingly, throughout the instant disclosure, references to a "vehicle operator" (or an "operator") may, where appropriate, refer to a human driving a vehicle, an autonomous vehicle control system, an autonomous vehicle, an owner of an autonomous vehicle, an operator of an autonomous vehicle, an attendant of an autonomous vehicle, a requesting user piloting a vehicle, and/or an autonomous system for piloting a vehicle. In one example, the TNC may implement multiple transportation systems, where each transportation system is responsible for coordinating transportation matching for a specific geographic region or set quantity of vehicles.

The transportation system may communicate with computing devices associated with the vehicles in the network, which may be separate computing devices and/or may be computing devices that are integrated into the respective vehicles. In some examples, one or more of the computing devices may be mobile devices, such as a smart phone. Additionally or alternatively, one or more of the computing devices may be tablet computers, personal digital assistants, or any other type or form of mobile computing device. Additionally, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or an operator for a transportation matching application, a navigation application, and/or any other application suited for use by requestors and/or operators). Additionally or alternatively, one or more of the computing devices may be devices suitable for installing in a vehicle and/or may be a vehicle's computer that has a transportation management system application installed on the computer to provide transportation services to transportation requestors and/or communicate with the transportation system.

FIG. 8 illustrates an example system 800 for matching transportation requests to a network of transportation vehicles according to one embodiment of the present disclosure. As illustrated, a transportation matching system 802 may communicate with user devices 804-806 requesting transportation. In some examples, the user devices 804-806 requesting transportation may include a requestor app 808 implemented by the transportation provider. The requestor app 808 may represent any application, program, and/or module that may provide one or more services related to requesting transportation services. For example, the requestor app 808 may include a transportation matching application for requestors. In some examples, the requestor app may match the user of the requestor app 808 (e.g., a transportation requestor) with transportation providers 810 through communication with the transportation matching system 802 via the communications network 812. In addition, the requestor app 808 may provide the transportation matching system 802 with information about a requestor (including, e.g., the current location of the requestor) to enable the transportation matching system 802 to provide dynamic transportation matching services for the requestor and one or more transportation providers 810, each of which may include a provider device 814, 816, 818. Each provider device may include a provider app 820, which may be any application program and/or set of instructions that may provide one or more services related to operating a vehicle and/or providing transportation matching services in conjunction with the transportation matching system 802 and the requestor app 808.

In some examples, the requestor app 808 may coordinate communications and/or a payment between a requestor and a transportation provider 810. According to some embodiments, the requestor app 808 may provide a map service, a navigation service, a traffic notification service, and/or a geolocation service. The provider app 820 may provide similar functions. In other implementations, the requestor app 808 may allow users to request access to certain vehicles, such as personal mobility vehicles (e.g., bicycles and/or scooters).

The transportation matching system 802 may arrange transportation on an on-demand and/or ad-hoc basis by, e.g., matching one or more transportation requestors with one or more transportation providers 810. For example, the transportation matching system 802 may provide one or more transportation matching services 822 for a networked transportation service, a ridesourcing service, a taxicab service, a car-booking service, an autonomous vehicle service, a personal mobility vehicle service, or some combination and/or derivative thereof. The transportation matching system 802 may include and/or interface with any of a variety of subsystems that may implement, support, and/or improve the transportation matching services 822. For example, the transportation matching services 822 may include or otherwise interface with a matching system (e.g., that matches requestors to ride opportunities and/or that arranges for requestors and/or providers to meet), a mapping system, a routing system (e.g., to help a provider reach a requestor, to help a requestor reach a provider, and/or to help a provider reach a destination), a rating system (e.g., to rate and/or gauge the reliability of a requestor and/or a provider), a payment system, and/or an autonomous or semi-autonomous driving system. The transportation matching system 802 may be implemented on various platforms, including a requestor-owned mobile device, a computing system installed in a vehicle, a server computer system, or any other hardware platform capable of providing transportation matching services to one or more requestors and/or providers.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system comprising:
   at least one processor; and
   at least one non-transitory computer readable storage medium storing instructions that, when executed by the at least one processor, cause the system to:
   generate a map by:
      transmitting a location of a user device;
      receiving locations of vehicles located near the location of the user device, the vehicles including first vehicles of a first type and second vehicles of a second type;
      determining an initial zoom level for the map based on the locations of the vehicles near the location of the user device by identifying, utilizing a predetermined threshold of vehicles, a number of the vehicles that satisfy the predetermined threshold of vehicles;
      based on the number of vehicles identified to satisfy the predetermined threshold of vehicles, generating the map at the initial zoom level for display on a graphical user interface of the user device;
      determining a location of a cluster based on a first subset of the first vehicles being within a predetermined distance of one another, wherein the location of the cluster represents locations of the first subset of the first vehicles;
      selecting a second subset of the second vehicles utilizing an information density threshold;
      generating the map that comprises the initial zoom level, a first vehicle cluster identifier at the location of the cluster of the first subset of the first vehicles and a plurality of individual vehicle identifiers at a plurality of locations of the second subset of the second vehicles; and
      providing the map for display via a user interface of the user device;
   in response to a user interaction with the user interface of the user device, generate an updated map at an additional zoom level;
   provide, for display via the user interface of the user device, the updated map at the additional zoom level, wherein the updated map comprises a second vehicle cluster identifier representing locations of an additional subset of the first vehicles and further comprises an individual vehicle identifier of the plurality of individual vehicle identifiers of the second subset of the second vehicles;
   in response to a user selection of the second vehicle cluster identifier or the individual vehicle identifier, generate a transportation match between the user device and a vehicle corresponding to the user selection of the second vehicle cluster identifier or the individual vehicle identifier; and
   based on the transportation match, cause a provider device to provide transportation to a user of the user device.

2. The system of claim 1, further comprising instructions that when executed by the at least one processor, cause the system to:
   receive an additional user interaction with the user interface of the user device comprising a zoom level that at least partially overlaps an area depicted by the additional zoom level;
   in response to the additional user interaction, remove the second vehicle cluster identifier representing locations of the additional subset of the first vehicles and replacing the second vehicle cluster identifier with separate visual indications of one or more of the additional subset of the first vehicles; and
   provide, for display via the user interface of the user device, an additional updated map at the zoom level that at least partially overlaps the area depicted by the additional zoom level, wherein the updated map comprises the separate visual indications for the one or more of the additional subset of the first vehicles.

3. The system of claim 1, further comprising instructions that when executed by the at least one processor, cause the system to:
   receive an additional user interaction with the user interface of the user device comprising a zoom level that at least partially overlaps an area depicted by the additional zoom level;
   in response to the additional user interaction, update the second vehicle cluster identifier representing locations of the additional subset of the first vehicles to further include an additional vehicle from the first vehicles; and provide, for display via the user interface of the user device, an additional updated map at the zoom level that at least partially overlaps the area depicted by the additional zoom level, wherein the updated map comprises the second vehicle cluster identifier that includes the additional subset of the first vehicles and the additional vehicle from the first vehicles.

4. The system of claim 1, further comprising instructions that when executed by the at least one processor, cause the system to select the second subset of the second vehicles based on at least one of a predicted destination of a user associated with the user device or vehicles previously utilized by a user associated with the user device.

5. The system of claim 1, further comprising instructions that when executed by the at least one processor, cause the system to generate the map at the initial zoom level based on at least one of vehicles previously utilized by a user associated with the user device, the first type of the first vehicles and the second type of the second vehicles, or a predicted destination of a user associated with the user device.

6. The system of claim 1, further comprising instructions that when executed by the at least one processor, cause the system to:
determine a first predetermined threshold of vehicles for the first type of the first vehicles;
determine a second predetermined threshold of vehicles for the second type of the second vehicles;
based on the locations of the vehicles near the location of the user device, identify, utilizing the first predetermined threshold of vehicles and the second predetermined threshold of vehicles, a number of the vehicles that satisfy the first predetermined threshold of vehicles and the second predetermined threshold of vehicles; and
based on the number of the vehicles satisfying the first predetermined threshold of vehicles and the second predetermined threshold of vehicles, generate the map at the initial zoom level for display on the graphical user interface of the user device.

7. The system of claim 1, further comprising instructions that when executed by the at least one processor, cause the system to provide the map for display via the user interface with at least one status indicator for at least one of the first subset of the first vehicles and the second subset of the second vehicles, the at least one status indicator providing a visual indication of a usability status of vehicles associated with at least one of the cluster and the second subset of the second vehicles.

8. The system of claim 7, further comprising instructions that when executed by the at least one processor, cause the system to:
detect a change in a ride status for a user associated with the user device; and
adjust the usability status indicated by the at least one status indicator to account for the change in the ride status.

9. A method comprising:
generating a map by:
transmitting a location of a user device;
receiving locations of vehicles located near the location of the user device, the vehicles including first vehicles of a first type and second vehicles of a second type;
determining an initial zoom level for the map based on the locations of the vehicles near the location of the user device by identifying, utilizing a predetermined threshold of vehicles, a number of the vehicles that satisfy the predetermined threshold of vehicles;
based on the number of vehicles identified to satisfy the predetermined threshold of vehicles, generating the map at the initial zoom level for display on a graphical user interface of the user device;
determining a location of a cluster based on a first subset of the first vehicles being within a predetermined distance of one another, wherein the location of the cluster represents locations of a first subset of the first vehicles;
selecting a second subset of the second vehicles utilizing an information density threshold;
generating the map that comprises the initial zoom level, a first vehicle cluster identifier at the location of the cluster of the first subset of the first vehicles and a plurality of individual vehicle identifiers at a plurality of locations of the second subset of the second vehicles; and
providing the map for display via a user interface of the user device;
in response to a user interaction with the user interface of the user device, generating an updated map at an additional zoom level;
providing, for display via the user interface of the user device, the updated map at the additional zoom level, wherein the updated map comprises a second vehicle cluster identifier representing locations of an additional subset of the first vehicles and further comprises an individual vehicle identifier of the plurality of individual vehicle identifiers of the second subset of the second vehicles;
in response to a user selection of the second vehicle cluster identifier or the individual vehicle identifier, generating a transportation match between the user device and a vehicle corresponding to the user selection of the second vehicle cluster identifier or the individual vehicle identifier; and
based on the transportation match, causing a provider device to provide transportation to a user of the user device.

10. The method of claim 9, further comprising:
receiving an additional user interaction with the user interface of the user device comprising a zoom level that at least partially overlaps an area depicted by the additional zoom level;
in response to the additional user interaction, removing the second vehicle cluster identifier representing locations of the additional subset of the first vehicles and replacing the second vehicle cluster identifier with separate visual indications of one or more of the additional subset of the first vehicles; and
providing, for display via the user interface of the user device, an additional updated map at the zoom level that at least partially overlaps the area depicted by the additional zoom level, wherein the updated map comprises the separate visual indications for the one or more of the additional subset of the first vehicles.

11. The method of claim 9, further comprising:
receiving an additional user interaction with the user interface of the user device comprising a zoom level that at least partially overlaps an area depicted by the additional zoom level;
in response to the additional user interaction, updating the second vehicle cluster identifier representing locations of the additional subset of the first vehicles to further include an additional vehicle from the first vehicles; and providing, for display via the user interface of the user device, an additional updated map at the zoom level that at least partially overlaps the area depicted by the additional zoom level, wherein the updated map comprises the second vehicle cluster identifier that includes the additional subset of the first vehicles and the additional vehicle from the first vehicles.

12. The method of claim 9, wherein selecting the second subset of the second vehicles further comprises selecting at least one of a predicted destination of a user associated with the user device, or vehicles previously utilized by a user associated with the user device.

13. The method of claim 9, wherein generating the map further comprises generating the map at the initial zoom level based on at least one of vehicles previously utilized by a user associated with the user device, the first type of the first vehicles and the second type of the second vehicles, or a predicted destination of a user associated with the user device.

14. The method of claim 9, further comprising:
determining a first predetermined threshold of vehicles for the first type of the first vehicles;
determining a second predetermined threshold of vehicles for the second type of the second vehicles;
based on the locations of the vehicles near the location of the user device, identifying, utilizing the first predetermined threshold of vehicles and the second predetermined threshold of vehicles, a number of the vehicles that satisfy the first predetermined threshold of vehicles and the second predetermined threshold of vehicles; and
based on the number of the vehicles satisfying the first predetermined threshold of vehicles and the second predetermined threshold of vehicles, generating the map at the initial zoom level for display on a graphical user interface of the user device.

15. The method of claim 9, wherein providing the map further comprises providing for display at least one status indicator for at least one of the first subset of the vehicles and the second subset of the vehicles, the at least one status indicator providing a visual indication of a usability status of vehicles associated with at least one of the cluster and the second subset of the vehicles.

16. The method of claim 15, further comprising:
detecting a change in a ride status for a user associated with the user device; and
adjusting the usability status indicated by the at least one status indicator to account for the change in the ride status.

17. A non-transitory, computer-readable medium storing instructions thereon that, when executed by at least one processor, cause the at least one processor to:
generate a map by:
transmitting a location of a user device;
receiving locations of vehicles located near the location of the user device, the vehicles including first vehicles of a first type and second vehicles of a second type;
determining an initial zoom level for the map based on the locations of the vehicles near the location of the user device by identifying, utilizing a predetermined threshold of vehicles, a number of the vehicles that satisfy the predetermined threshold of vehicles;
based on the number of vehicles identified to satisfy the predetermined threshold of vehicles, generating the map at the initial zoom level for display on a graphical user interface of the user device;
determining a location of a cluster based on a first subset of the first vehicles being within a predetermined distance of one another, wherein the location of the cluster represents locations of the first subset of the first vehicles;
selecting a second subset of the second vehicles utilizing an information density threshold;
generating the map that comprises the initial zoom level, a first vehicle cluster identifier at the location of the cluster of the first subset of the first vehicles and a plurality of individual vehicle identifiers at a plurality of locations of the second subset of the second vehicles; and
providing the map for display via a user interface of the user device;
in response to a user interaction with the user interface of the user device, generate an updated map at an additional zoom level;
provide, for display via the user interface of the user device, the updated map at the additional zoom level, wherein the updated map comprises a second vehicle cluster identifier representing locations of an additional subset of the first vehicles and further comprises an individual vehicle identifier of the plurality of individual vehicle identifiers of the second subset of the second vehicles;
in response to a user selection of the second vehicle cluster identifier or the individual vehicle identifier, generate a transportation match between the user device and a vehicle corresponding to the user selection of the second vehicle cluster identifier or the individual vehicle identifier; and
based on the transportation match, cause a provider device to provide transportation to a user of the user device.

18. The non-transitory, computer-readable medium of claim 17, further comprising instructions that, when executed by the at least one processor, cause the at least one processor to:
receive an additional user interaction with the user interface of the user device comprising a zoom level that at least partially overlaps an area depicted by the additional zoom level;
in response to the additional user interaction, remove the second vehicle cluster identifier representing locations of the additional subset of the first vehicles and replacing the second vehicle cluster identifier with separate visual indications of one or more of the additional subset of the first vehicles; and
provide, for display via the user interface of the user device, an additional updated map at the zoom level that at least partially overlaps the area depicted by the additional zoom level, wherein the updated map comprises the separate visual indications for the one or more of the additional subset of the first vehicles.

19. The non-transitory, computer-readable medium of claim 17, further comprising instructions that, when executed by the at least one process or, cause the at least one processor to:
receive an additional user interaction with the user interface of the user device comprising a zoom level that at least partially overlaps an area depicted by the additional zoom level;

in response to the additional user interaction, update the second vehicle cluster identifier representing locations of the additional subset of the first vehicles to further include an additional vehicle from the first vehicles; and provide, for display via the user interface of the user device, an additional updated map at the zoom level that at least partially overlaps the area depicted by the additional zoom level, wherein the updated map comprises the second vehicle cluster identifier that includes the additional subset of the first vehicles and the additional vehicle from the first vehicles.

20. The non-transitory, computer-readable medium of claim 17, further comprising instructions that, when executed by the at least one processor, cause the at least one processor to:

determine a first predetermined threshold of vehicles for the first type of the first vehicles;

determine a second predetermined threshold of vehicles for the second type of the second vehicles;

based on the locations of the vehicles near the location of the user device, identify, utilizing the first predetermined threshold of vehicles and the second predetermined threshold of vehicles, a number of the vehicles that satisfy the first predetermined threshold of vehicles and the second predetermined threshold of vehicles; and based on the number of the vehicles satisfying the first predetermined threshold of vehicles and the second predetermined threshold of vehicles, generate the map at the initial zoom level for display on a graphical user interface of the user device.

* * * * *